(12) United States Patent  (10) Patent No.: US 7,610,910 B2
Ahmed  (45) Date of Patent: Nov. 3, 2009

(54) METHOD AND APPARATUS FOR CONTROLLING BUILDING COMPONENT CHARACTERISTICS

(75) Inventor: Osman Ahmed, Hawthorn Woods, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 638 days.

(21) Appl. No.: 11/090,925

(22) Filed: Mar. 25, 2005

(65) Prior Publication Data

US 2005/0268629 A1 Dec. 8, 2005

Related U.S. Application Data

(60) Provisional application No. 60/556,119, filed on Mar. 25, 2004.

(51) Int. Cl.
*E06B 3/66* (2006.01)
*G01K 7/00* (2006.01)
*F24J 2/40* (2006.01)

(52) U.S. Cl. .............. 126/595; 126/597; 126/633; 126/640; 126/646; 126/678; 165/236; 52/171.3; 700/276; 700/278; 700/299; 700/300; 359/275

(58) Field of Classification Search ......... 359/265–275; 165/236; 700/276, 278, 299, 300; 126/633, 126/678, 640, 646, 595, 597; 52/171.3
See application file for complete search history.

(56) References Cited

U.S. PATENT DOCUMENTS

| | | | |
|---|---|---|---|
| 4,380,994 A * | 4/1983 | Seemann | 126/633 |
| 4,555,764 A * | 11/1985 | Kuehn | 700/299 |
| 5,297,252 A | 3/1994 | Becker | 395/160 |
| 5,361,198 A | 11/1994 | Harmon et al. | 364/188 |
| 5,562,537 A | 10/1996 | Zver et al. | |
| 5,631,825 A | 5/1997 | van Weele et al. | 364/188 |
| 5,940,150 A * | 8/1999 | Faris et al. | 349/16 |
| 6,064,949 A * | 5/2000 | Werner et al. | 702/134 |
| 6,137,403 A | 10/2000 | Desrochers et al. | 340/540 |
| 6,169,927 B1 | 1/2001 | Schonthal et al. | 700/1 |
| 6,199,575 B1 | 3/2001 | Widner | 137/227 |
| 6,232,968 B1 | 5/2001 | Alimpich et al. | 345/333 |
| 6,255,962 B1 * | 7/2001 | Tanenhaus et al. | 340/870.05 |
| 5,737,318 A1 | 11/2001 | Dungan | |
| 6,493,128 B1 * | 12/2002 | Agrawal et al. | 359/265 |

(Continued)

FOREIGN PATENT DOCUMENTS

DE 4127130 A1 * 2/1993

(Continued)

OTHER PUBLICATIONS

PCT International Search Report—2002P01349WO.

(Continued)

*Primary Examiner*—John K Ford

(57) ABSTRACT

A building component system includes a building component that is controllable between a first state and a second state in response to a sensed condition. The system may include a sensor on a first side of the building component and a sensor on the second side of the building component. The building component may be a window that is controllable between an opaque state and a clear state by a micro electromechanical system (MEMS) network that senses the conditions on both sides of the window.

14 Claims, 19 Drawing Sheets

U.S. PATENT DOCUMENTS

| | | |
|---|---|---|
| 6,625,500 B1 | 9/2003 | Li |
| 6,735,630 B1 * | 5/2004 | Gelvin et al. ............... 709/224 |
| 6,965,813 B2 * | 11/2005 | Granqvist et al. ........... 700/276 |
| 2001/0025349 A1 | 9/2001 | Sharood et al. ............. 713/340 |
| 2002/0022894 A1 | 2/2002 | Eryurek et al. ................ 700/80 |
| 2002/0100578 A1 | 8/2002 | Withers et al. |
| 2003/0058515 A1 | 3/2003 | Sanford |
| 2004/0008651 A1 | 1/2004 | Ahmed |
| 2004/0019392 A1 | 1/2004 | Hirai |
| 2004/0088082 A1 | 5/2004 | Ahmed |

FOREIGN PATENT DOCUMENTS

| | | | |
|---|---|---|---|
| EP | 0068289 | | 1/1983 |
| EP | 0 940 787 A2 | | 9/1999 |
| EP | 1696371 | | 8/2006 |
| FR | 2535071 A | * | 4/1984 |
| WO | WO 99/57697 | | 11/1999 |
| WO | WO 00/54237 | | 9/2000 |
| WO | WO 01/26330 A2 | | 4/2001 |
| WO | WO 01/35190 A2 | | 5/2001 |
| WO | WO 01/93220 A1 | | 12/2001 |
| WO | WO 02/31607 A2 | | 4/2002 |
| WO | 2004038525 | | 5/2004 |

OTHER PUBLICATIONS

PCT International Search Report—2002P11662WO.

* cited by examiner

METHOD AND APPARATUS FOR CONTROLLING BUILDING COMPONENT CHARACTERISTICS

This application claims the benefit of and/or priority to U.S. provisional application Ser. No. 60/556,119, filed Mar. 25, 2004.

FIELD OF THE INVENTION

The present invention relates generally to control systems, such as control systems used to control heating, ventilation, air conditioning, fire safety, lighting, security and other systems or machinery of a building or facility.

BACKGROUND OF THE INVENTION

Heating, ventilation and air-conditioning ("HVAC") systems are used in all types of commercial, industrial and residential facilities (hereinafter referred to as "buildings"). In general, the HVAC system is designed to maintain various predetermined set points, such as temperature. To that end, a system that generates hot air may be controlled on or off depending on the need for heat in a particular location. The supply of conditioned air (hot or cold) may further be controlled by the use of dampers within the air supply system. In larger buildings, the dampers may be actively controlled to regulate the supply of conditioned air.

HVAC systems in larger buildings tend be located at a significant distance from the spaces that they are servicing, and a single HVAC unit may be used to provide conditioned air to several different floors. To this end, ducting is required between the various floors, a number of dampers are needed to regulate the distribution of air between the various levels, and additional insulation around the ducting is needed to reduce heat loss from the ducting. The result is reduced efficiency, additional material cost, and additional space requirements for a given HVAC system.

Moreover, conditioned air is generally provided by an HVAC system based upon a sensed out of limits condition. In other words, when the temperature in a room is determined to be too warm, cool air is supplied to the room so as to bring the room back within a controlled band. The HVAC systems are accordingly reactive to actual changes in temperature. While this is effective, it results in undesired variances in temperature. Moreover, as the magnitude of the change in temperature increases, the amount of energy required to drive the temperature back into the desired range in a given amount of time also increases. Thus, a larger HVAC system is needed to provide the needed capacity. As the size of the HVAC system increases, larger ducting is needed for the increased volume of air and more energy is required to power the HVAC system. The result is reduced efficiency, additional material cost, and additional space requirements for a given HVAC system.

Some of the above limitations result from the approach used to regulate, monitor and control the various machines as well as environmental and safety aspects of buildings. For example, to facilitate control over various aspects of a building, control systems employ sensing devices that measure various conditions, such as temperature, air flow, or motion. Other sensors determine the presence of smoke, the presence of dangerous or noxious chemicals, light and the like.

Typical sensor devices for such uses are expensive. Accordingly, the number of sensors used in a particular application is limited to the minimum number required in order to reduce costs. For example, in many residential systems a single temperature sensor is used. Similarly, the temperature within a conference room may be controlled based upon the sensing of a single instrument. Such limited sensing results in large temperature differentials throughout the space. Such temperature differentials result not only in reduced comfort for the individuals in the building, but also reduced efficiency in the HVAC system as discussed above.

The above illustration is indicative of a larger problem with prior art building control systems. Namely, prior art building control systems are designed to operate with very limited knowledge of the building that they are incorporated into. There is little understanding within the building control system of the activities within and around the building that affect the environment such as weather conditions, the operating status of machinery and equipment, or the number of people in the building.

Moreover, the building itself may provide a significant contribution to the internal environment. This is particularly evident in the instance of a building with a large amount of glass on a sunny day. In such instances, the glass may provide significantly to the heating of the building. Yet, prior art buildings contribute little to the active control over the internal environment. Thus, the building control system must be manually configured to avoid significant overheating of one side of a building while under heating areas that are not exposed to the sunlight.

As a consequence, there is a need for apparatus and method that can reduce at least some of the drawbacks and costs identified above. For example, there is a need for a method and/or apparatus that reduces the costs associated with the sensing devices that are necessary for sensing conditions within a building control system. There is a further need for a system that incorporates building components into the building control network so as to better control fluctuations in the building environment. There is yet a further need for a building control system that includes sensors located close to the source of heat and cold disturbances within a building so as to provide for more rapid moderation of the disturbances.

SUMMARY OF THE INVENTION

The present invention provides a building control system for controlling a characteristic of a building component. In one embodiment, a building control system includes a building control network and an integrated micro electromechanical system module network. The micro electromechanical system module network controls the state of a building envelope component based upon a sensed first condition.

In another embodiment, a building component system includes a building component located between a first area and a second area that is controllable between a first state and a second state. The building component system further includes a first sensor for sensing a first condition in the first area and a second sensor for sensing a second condition in the second area. A controller controls the state of the component based upon the sensed first condition and the sensed second condition.

A method in accordance with aspects of the invention controls an energy transmission characteristic of a building component located between a first area and a second area by sensing a first condition in the first area and sensing a second condition in the second area. A signal indicative of the first sensed condition is transmitted to a controller and the energy transmission characteristic of the component is controlled based upon the sensed first condition and the sensed second condition.

The above described features and advantages, as well as others, will become more readily apparent to those of ordinary skill in the art by reference to the following detailed description and accompanying drawings.

DETAILED DESCRIPTION

Figure 1:
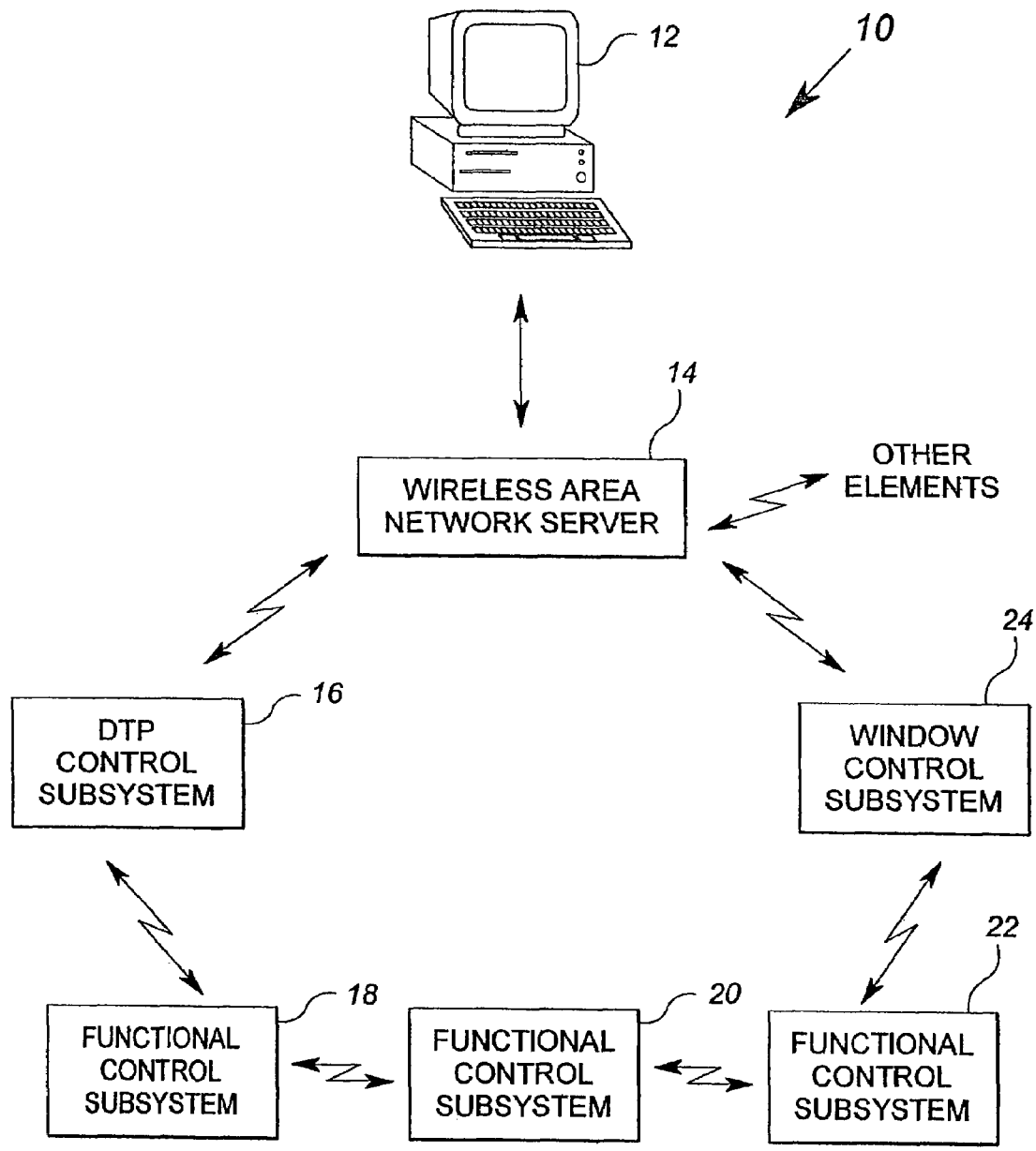
FIG. 1 shows a block diagram of an exemplary building control network according to the present invention.

FIG. 1 shows a block diagram of an exemplary building control system in accordance with the present invention. The building control system 10 includes a supervisory computer 12, a wireless area network (WAN) server 14, a distributed thermal plant (DTP) control subsystem 16, three functional control subsystems 18, 20 and 22, and a window control subsystem 24. The building control system 10 includes only the few above-mentioned elements for clarity of exposition of the principles of the invention. Typically, many more functional control subsystems, as well as many more window, thermal plant, and other building HVAC subsystems, will be included into a building control network. Those of ordinary skill in the art may readily incorporate the methods and features of the invention described herein into control systems of larger or smaller scale.

In general, the building control system 10 employs a first wireless communication scheme to effect communications between the supervisory computer 12, the DTP control subsystem 16, the functional control subsystems 18, 20 and 22 and the window control subsystem 24. A wireless communication scheme identifies the specific protocols and RF frequency plan employed in wireless communications between sets of wireless devices.

In the embodiment described herein, the first wireless communication scheme is implemented as a wireless area network. To this end, the wireless area network server 14 coupled to the supervisory computer 12 employs a packet-hopping wireless protocol to effect communication by and among the various subsystems of the building control system 10. U.S. Pat. No. 5,737,318, which is incorporated herein by reference, describes a wireless packet hopping network that is suitable for HVAC/building control systems of substantial size.

In general, the DTP control subsystem 16 is a subsystem that is operable to control the operation of a DTP plant within the building. The DTP is a device that is operable to provide hot or cold conditioned air. The DTP may further be configured to provide for all or a portion of the electrical needs of an area of a building. In such an embodiment, the DTP may include a fuel cell, a micro-turbine generator, or the DTP may be a hybrid device. Such devices produce energy in the form of electricity and heat. The heat may be used to heat air if the building area is to be heated. The heat may further be provided to an absorption chiller used to chill air if the building area is to be cooled.

By localized generation of power, significant utility savings may be realized. Additionally, the reliance on electricity provided over a power grid is eliminated thereby eliminating problems related to power grid brownouts and blackouts. Moreover, the DTPs produce very little noise and minimal exhaust gases. Therefore, they may be positioned very close to the area being serviced. Acceptable DTPs including combined heat, power and chill devices are commercially available from Capstone Microturbine Corporation of Chatsworth, Calif.

Various operations of DTP plants depend upon a number of input values, as is known in the art. Some of the input values may be generated within the DTP control subsystem 16, and other input values are externally generated. For example, operation of the DTP may be adjusted based on various air flow and/or temperature values generated throughout the area. The operation of the DTP may also be affected by set point values generated by the supervisory computer 12. The externally-generated values are communicated to the DTP control subsystem 16 using the wireless area network.

The functional control subsystems 18, 20 and 22 are local control subsystems that operate to control or monitor a micro-area or "space" within the area serviced by the DTP. While such locations may be referred to herein as "rooms" for convenience, it will be appreciated that such locations may further be defined zones within larger open or semi-open spaces of a building. The various functions for which the functional control subsystems 18, 20 and 22 are used include comfort (temperature, humidity, etc.), protection (fire, detection, chemical detection, etc), security (identification, tracking, etc.) and performance (equipment efficiency, operating characteristics, etc.).

Figure 2:
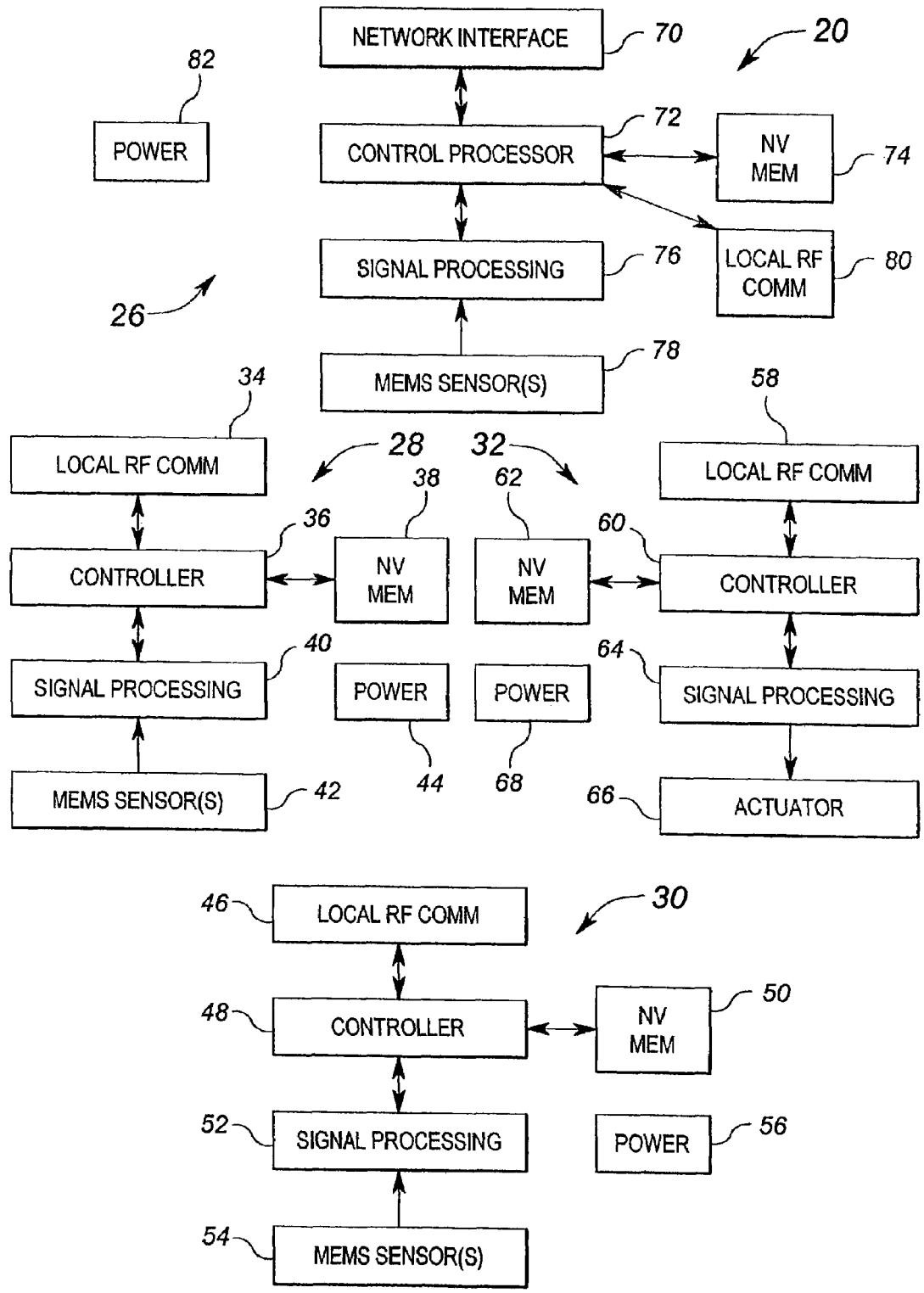
FIG. 2 shows a block diagram of an exemplary comfort MEMS module control network integrated as a control subsystem with the building control network of FIG. 1.

In accordance with one aspect of the present invention, each of the functional control subsystems 18, 20 and 22 includes multiple elements that communicate with each other using a second wireless communication scheme. In general, it is preferable that the second communication scheme employ a short-range or local RF communication scheme such as Bluetooth. FIG. 2 shows a schematic block diagram of an exemplary functional control subsystem that may be used as the functional control subsystems 18, 20 and 22.

Referring to FIG. 2, the functional control subsystem 18 includes a hub module 26, first and second sensor modules 28 and 30, respectively, and an actuator module 32. It will be appreciated that a particular functional control subsystem 18 may contain more or less sensor modules or actuator modules. In the exemplary embodiment described herein, the functional control subsystem 18 is operable to assist in regulating the temperature within a room or space pursuant to a set point value. The functional control subsystem 18 is further operable to obtain data regarding the general environment of the room for use, display or recording by a remote device, such as the supervisory computer 12 of FIG. 1.

The first sensor module 28 represents a temperature sensor module and is preferably embodied as a wireless integrated network sensor that incorporates micro electromechanical system ("MEMS") technology. By way of example, in the exemplary embodiment described herein, the first sensor module 28 includes a MEMS local RF communication circuit 34, a microcontroller 36, a programmable non-volatile memory 38, a signal processing circuit 40, and a MEMS sensor suite 42. The first sensor module 28 also contains a coin cell battery 44.

The MEMS sensor suite 42 includes at least one MEMS sensor, which may suitably be a temperature sensor, flow sensor, pressure sensor, and/or gas-specific sensor. MEMS devices capable of obtaining light, gas content, temperature, flow, and smoke readings have been developed and are known in the art. In one embodiment, the sensor suite 42 is a collection of MEMS sensors incorporated into a single substrate. The incorporation of multiple MEMS sensor technologies on a single substrate is known. For example, a MEMS module that includes both temperature and humidity sensing functions is commercially available from Hygrometrics Inc. of Alpine Calif.

The MEMS modules may be self-configuring and self-commissioning. Accordingly, when the sensor modules are placed within communication range of each other, they will form a piconet as is known in the relevant art and each will enable a particular sensing capability. In the case that a sensor module is placed within range of an existent piconet, the sensor module will join the existent piconet. By incorporating different, selectable sensor capabilities, a single sensor module design may be manufactured for use in a large majority of HVAC sensing applications.

The signal processing circuit 40 includes the circuitry that interfaces with the sensor suite 42, converts analog sensor signals to digital signals, and provides the digital signals to the microcontroller 36.

The programmable non-volatile memory 38, which may be embodied as a flash programmable EEPROM, stores configuration information for the sensor module 28. By way of example, programmable non-volatile memory 38 preferably includes system identification information, which is used to associate the information generated by the sensor module 28 with its physical and/or logical location in the building control system. For example, the programmable non-volatile memory 38 may contain an "address" or "ID" of the sensor module 28 that is appended to any communications generated by the sensor module 28.

The memory 38 further includes set-up configuration information related to the type of sensor or sensors being used. For example, if the sensor suite 42 is implemented as a number of sensor devices, the memory 38 includes the information that identifies which sensor functionality to enable. The memory 38 may further include calibration information regarding the sensor, and system RF communication parameters (i.e. the second RF communication scheme) employed by the microcontroller 36 and/or RF communication circuit 34 to transmit information to other devices.

The microcontroller 36 is a processing circuit operable to control the general operation of the sensor module 28. In general, however, the microcontroller 36 receives digital sensor information from the signal processing circuit 40 and provides the information to the local RF communication circuit 34 for transmission to a local device, for example, the hub module 26. The microcontroller 36 may cause the transmission of sensor data from time-to-time as dictated by an internal counter or clock, or in response to a request received from the hub module 26.

The microcontroller 36 is further operable to receive configuration information via the RF communication circuit 34, store configuration information in the memory 38, and perform operations in accordance with such configuration information. As discussed above, the configuration information may define which of multiple possible sensor combinations is to be provided by the sensor module 28. The microcontroller 36 employs such information to cause the appropriate sensor device or devices from the sensor suite 42 to be operably connected to the signal processing circuit 40 such that sensed signals from the appropriate sensor device are digitized and provided to the microcontroller 36. As discussed above, the microcontroller 36 may also use the configuration information to format outgoing messages and/or control operation of the RF communication circuit 34.

The MEMS local RF communication circuit 34 may suitably include a Bluetooth RF modem, or some other type of short range (about 30-100 feet) RF communication modem. The use of a MEMS-based RF communication circuit allows for reduced power consumption, thereby enabling the sensor module 28 to be battery operated. The life of the sensor may be extended using known power management approaches. Additionally, the battery may be augmented or even replaced by incorporating within the MEMS module structure to use or convert energy in the form of vibrations or ambient light.

As discussed above, the sensor module 28 is configured to operate as a temperature sensor. To this end, the memory 38 stores information identifying that the sensor module 28 is to operate as a temperature sensor. Such information may be programmed into the memory 28 via a wireless programmer. The sensor module 28 may be programmed upon shipment from the factory, or upon installation into the building control system. The microcontroller 36, responsive to the configuration information, causes the signal processing circuit 40 to process signals only from the temperature sensor, ignoring output from other sensors of the sensor suite 42.

The sensor module 30 is configured to operate as a flow sensor in the embodiment described herein. The sensor module 30 may suitably have the same physical construction as the sensor module 28. To this end, the sensor module 30 includes a local RF communication circuit 46, a microcontroller 48, a programmable non-volatile memory 23504, a signal processing circuit 52, a sensor suite 54, and a power supply/source 56. In contrast to the sensor module 28, however, the memory 50 of the sensor module 30 contains configuration information identifying that the sensor module 54 is to function as a flow sensor.

The actuator module 32 is a device that is operable to cause movement or actuation of a physical device that has the ability to affect a parameter of the building environment. For example, the actuator module 32 in the embodiment described herein is operable to control the position of a ventilation damper, thereby controlling the flow of heated or chilled air into the room.

The actuator module 32 is also preferably embodied as a MEMS module. By way of example, in the exemplary embodiment described herein, the actuator module 32 includes a MEMS local RF communication circuit 58, a microcontroller 60, a programmable non-volatile memory 62, a signal processing circuit 64 and an actuator 66. The actuator module 32 also contains a coin cell battery 68.

Of course, if AC power is necessary for the actuator device (i.e. the damper actuator), which may be solenoid or valve, then AC power is readily available for the actuator module 32. As a consequence, the use of battery power is not necessarily advantageous. The actuator 66 may suitably be a solenoid, stepper motor, or other electrically controllable device that drives a mechanical HVAC element.

The MEMS local RF communication circuit 58 may be of similar construction and operation as the MEMS local RF communication circuit 34. The microcontroller 60 is configured to receive control data messages via the RF communication circuit 58. The control data messages are generated and transmitted by the hub module 26. The control data messages typically include a control output value intended to control the operation of the actuator 66. Accordingly, the microcontroller 60 is operable to obtain the control output value from a received message and provide the control output value to the signal processing circuit 64. The signal processing circuit 64 is a circuit that is configured to generate an analog control signal from the digital control output value. In other words, the signal processing circuit 64 operates as an analog driver circuit. The signal processing circuit 64 provides an analog control signal to the actuator 66.

The non-volatile memory 62 is a memory that contains configuration and/or calibration information related to the implementation of the actuator 66. The memory 62 may suitably contain sufficient information to effect mapping between the control variables used by the hub module 26 and the control signals expected by the actuator 66. For example, the control variables used by the hub module 26 may be digital values representative of a desired damper position charge. The actuator 66, however, may expect an analog voltage that represents an amount to rotate a stepper motor. The memory 62 may thus include information used to map the digital values to the expected analog voltages.

The hub module 26 in the exemplary embodiment described herein performs the function of the loop controller (e.g. a proportional-integral-differential (PID) controller) for the functional control subsystem 20. The hub module 26 obtains process variable values (i.e. sensor information) from either or both of the sensor modules 28 and 30 and generates control output values. The hub module 26 provides the control output values to the actuator module 32. The hub module 26 also communicates with external elements of the building control system, for example, the supervisory computer 12, the DTP control subsystem 16, the window control subsystem 24, and other functional control subsystems.

The hub module 26 further includes sensor functionality. In some applications, it may be advantageous to combine the hub controller core functionality with a sensor function to reduce the overall number of devices in the system. Thus, some room control subsystems could include hub module 26 with an integrated temperature sensor and one or more actuator modules. Separate sensor modules such as the sensor module 28 would not be necessary. In other applications, a large number of sensors may be desired. Thus, some room control subsystems may include a number of hub modules in communication with the hub module 26.

To accomplish these and other functions, the hub module 26 includes a network interface 70, a room control processor 72, a non-volatile memory 74, a signal processing circuit 76, a MEMS sensor suite 78 and a MEMS local RF communication circuit 80.

The network interface 70 is a communication circuit that effectuates communication to one or more components of the building control system that are not a part of the functional control subsystem 18. Referring to FIG. 1, the network interface 70 is the device that allows the functional control subsystem 20 to communicate with the supervisory computer 12, the DTP control subsystem 16, the window control subsystem 24 and/or the other functional control subsystems.

Referring again to FIG. 2, to allow for wireless communication between control subsystems of the building control system 10, the network interface 70 is preferably an RF modem configured to communicate using the wireless area network communication scheme. Preferably, the network interface 70 employs a packet-hopping protocol to reduce the overall transmission power required. In packet-hopping, each message may be transmitted through multiple intermediate network interfaces before it reaches its destination as is known in the relevant art.

In order to facilitate the wireless area network operation, the network interface 70 is preferably operable to communicate using a short range wireless protocol. The network interface 70 is further operable to, either alone or in conjunction with the control processor 72, interpret messages in wireless communications received from external devices and determine whether the messages should be retransmitted to another external device, or processed by the hub module 26.

As discussed above, the hub module 26 may optionally include sensor capability. To this end, the MEMS sensor suite 78 may suitably include a plurality of MEMS sensors. As with the sensor modules 28 and 30, the hub module 26 may be programmed to enable the particular desired sensing capability. In this manner, a single hub module design may be manufactured to for use in a variety of HVAC sensing applications, each hub module 26 thereafter being configured for its particular use.

The signal processing circuit 76 includes the circuitry that interfaces with the sensor suite 78, converts analog sensor signals to digital signals, and provides the digital signals to the room control processor 72.

The programmable non-volatile memory 74, which may be embodied as a flash programmable EEPROM, stores configuration information for the hub module 26. The programmable non-volatile memory 74 preferably includes system identification information, which is used to associate the information generated by the sensor module 26 with its physical and/or logical location in the building control system. The memory 74 further includes set-up configuration information related to the type of sensor being used. The memory 74 may further include troubleshooting procedures for the functional network, calibration information regarding the sensor, and system RF communication parameters employed by the control processor 72, the network interface 70 and/or the local RF communication circuit 80.

The MEMS local RF communication circuit 80 may suitably include a Bluetooth RF modem, or some other type of short range (about 30-100 feet) RF communication modem. The MEMS local RF communication circuit 80 is operable to communicate using the same RF communication scheme as the MEMS local RF communication circuits 34, 46 and 58. As with the sensor module 28, the use of a MEMS-based RF communication circuit allows for reduced power consumption, thereby enabling the hub module 26 to be operated using a battery 82. Moreover, it may be possible and preferable to employ many of the same RF elements in both the local RF communication circuit 80 and the network interface 70.

The control processor 72 is a processing circuit operable to control the general operation of the hub module 74. In addition, the control processor 72 implements a control transfer function to generate control output values that are provided to the actuator 66 in the actuator module 32. To this end, the control processor 72 obtains sensor information from its own sensor suite 78 and/or from sensor modules 28 and 30. The control processor 72 also receives a set point value, for example, from the supervisory computer 12 via the network interface 70. The control processor 72 then generates the control output value based on the set point value and one or more sensor values. The control processor 72 may suitably implement a PID control algorithm to generate the control output values. Suitable control algorithms that generate control output values based on sensor or process values and set point values are known.

The functional control subsystems 20 and 22 are very similar to the functional control subsystem 18. Both are formed as a functional network of MEMS modules. In this embodiment, however, the functional control subsystem 20 is a protection subsystem and the functional control subsystem 22 is a security subsystem. Accordingly, the MEMS modules in the protection functional control subsystem 20 include a sensor suite with one or more sensors used to provide the function of protection. The sensors in the protection sensor suit may include a fire sensor, a smoke sensor, a chemical sensor and a biological sensor. Additional sensors may include vibration sensors, motion sensors and the like for monitoring structural characteristics of building components.

Similarly, the MEMS modules in the security functional control subsystem 22 include a sensor suite with one or more sensors used to provide the function of security. The sensors in the security sensor suite may include a biometric sensor, a complementary metal oxide semiconductor (CMOS) camera, a smart card sensor and a smart tagging/tracking sensor.

As described above, the functional control subsystems 18, 20 and 22 provide for different functions. Accordingly, all three control subsystems may be located within a single area or may be located in different areas. Moreover, the areas serviced by each of the functional control subsystems 18, 20 and 22 need not coincide. For example, a single security subsystem may be designed to cover the area serviced by two or three comfort control subsystems.

The window control subsystem 24 is a subsystem that is operable to control the state of a window. The state of the window control subsystem 24 is controlled to provide auxiliary heating and cooling and to minimize undesired heating and cooling as described below. The window control subsystem 24 is thus further identified as a comfort network.

Figure 3:
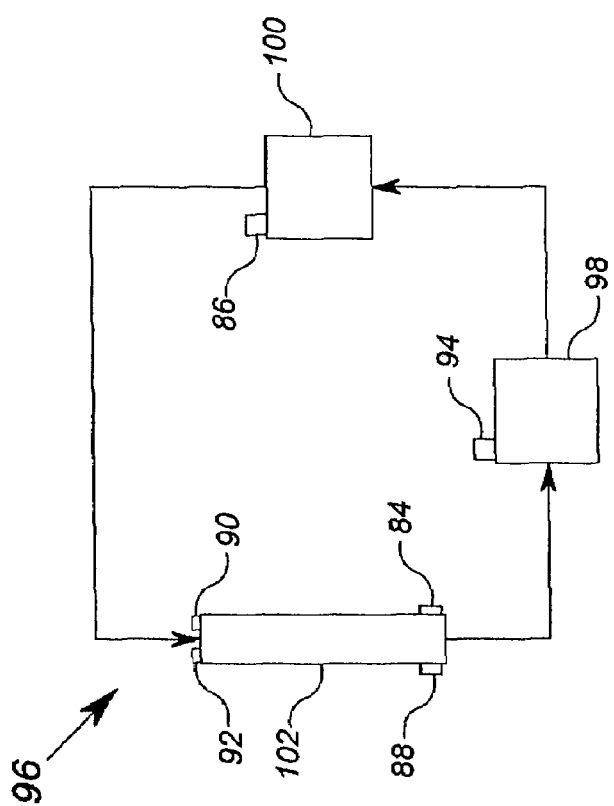
FIG. 3 shows a block diagram of a window control subsystem used to control a window comfort system.

Referring to FIG. 3, the window control subsystem 24 includes a hub module 84, two sensor modules 86 and 88, two activation control modules 90 and 92 and a pump control module 94. The window control subsystem 24 is part of a window comfort system 96 that further includes a pump 98, a thermal energy storage device 100 and a window 102.

The hub module 84 is mounted on the inside portion of the window 102 and is configured to receive input values from other subsystems (or the supervisory computer 12) over the wireless area network and to communicate with the other MEMS modules in the window control subsystem 24. The hub module 84 is further configured to act as a temperature sensor, thereby obtaining the temperature from the area of the building inside of the window 102.

The sensor module 86 is located on the thermal energy storage device 100 and is used to obtain the temperature of the thermal energy storage device 100. To this end, the sensor module 86 is configured as a temperature sensor. The sensor module 88 is mounted to the side of the window 102 opposite the hub module 96 and is configured as both a temperature sensor and a light sensor. The sensor module 88 is thus operable to determine the temperature outside of a building in which the window 98 is installed and to determine whether or not sunlight is present. The activation control modules 90 and 92 are configured to control the two sides of the window 102 as described below. The controller module 94 is configured to provide control signals to energize and de-energize the pump 98.

The general operation of the window comfort system 96 is as follows. The pump 98 pumps a thermal fluid through the thermal energy storage device 100. The thermal fluid then passes through the window 102 and returns to the suction portion of the pump 98. The thermal fluid thus transfers thermal energy between the window 102 and the thermal energy storage device 100. Increased control over the transfer of energy is accomplished by controlling thermal transmission characteristics of the window 102 so as to incorporate the window 102 into the building control network.

Figure 4:
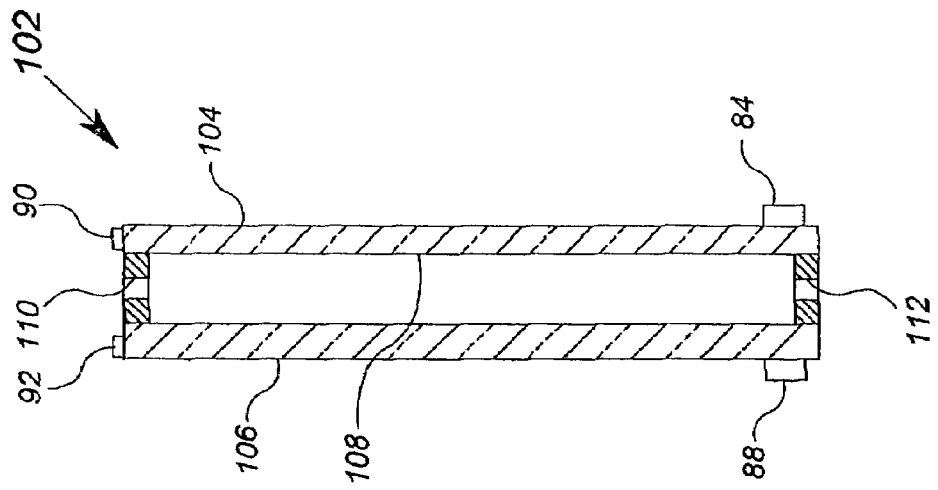
FIG. 4 shows a cross section of the window depicted in FIG. 3 including a two chromogenic layers and a thermal fluid chamber.

Referring to FIG. 4, the window 102 includes a layer 104 and a layer 106 which define a thermal fluid chamber 108. An inlet 110 to the thermal fluid chamber 108 is provided at one end of the window 102 and an outlet 112 is provided at the opposite end. Thermal fluid pumped to the window 102 by the pump 98 is supplied to the inlet 110 and returned to the pump 98 through the outlet 112.

The layer 104 and the layer 106 are electrically activated chromogenic systems. Electrically activated chromogenic systems are systems which exhibit different transmission characteristics depending upon the electrical charge that is or has been applied to the system. Examples of chromogenic systems include liquid crystal systems, dispersed particle systems and electrochromic systems.

The layer 104 and the layer 106 are electrically activated chromogenic systems. Electrically activated chromogenic systems are systems which exhibit different transmission characteristics depending upon the electrical charge that is or has been applied to the system. Examples of chromogenic systems include liquid crystal systems, dispersed particle systems and electrochromic systems. Liquid crystal systems operate by changing the orientation of liquid crystal molecules interspersed between two conductive electrodes thereby changing transparency. Dispersed particle systems operate by suspending needle shaped particles (such as nano particles) within an organic fluid or film. In the "off" position, the arrangement of the particles is random and light/energy is restrained from passing through the layer. When an electric field is applied, the particles align, thus allowing energy to pass through the layer. Electrochromic materials change their optical properties due to the action of an electric field. The electric field causes a dual injection or ejection of electrons and ions causing a change in the color of the material. The electric field need not be maintained to maintain the material in a particular color.

The layer 104 and the layer 106 may be independently controlled by the application of an electrical current to change from completely transparent to opaque. When in a completely transparent state, the layers 104 and 106 allow light to pass and are good conductors of heat. When in an opaque state, the layers 104 and 106 are reflective and are poor conductors of heat.

Control of the state of the layers 104 and 106 is effected by the activation control modules 90 and 92, respectively. To this end, the activation control modules 90 and 92 are operable to control the application of a voltage to the layers 104 and 106 so as to control the thermal transmission characteristics and reflectivity of the layers 104 and 106.

The thermal transfer capacity of the window comfort system 96 may be enhanced by the incorporation of nano materials, such as carbon, suspended within the thermal fluid. Accordingly, as is discussed in U.S. Patent Application Publication No. U.S. 2002/0100578, the thermal fluid exhibits increased thermal transfer characteristics while at the same time remaining transparent.

Figure 5:
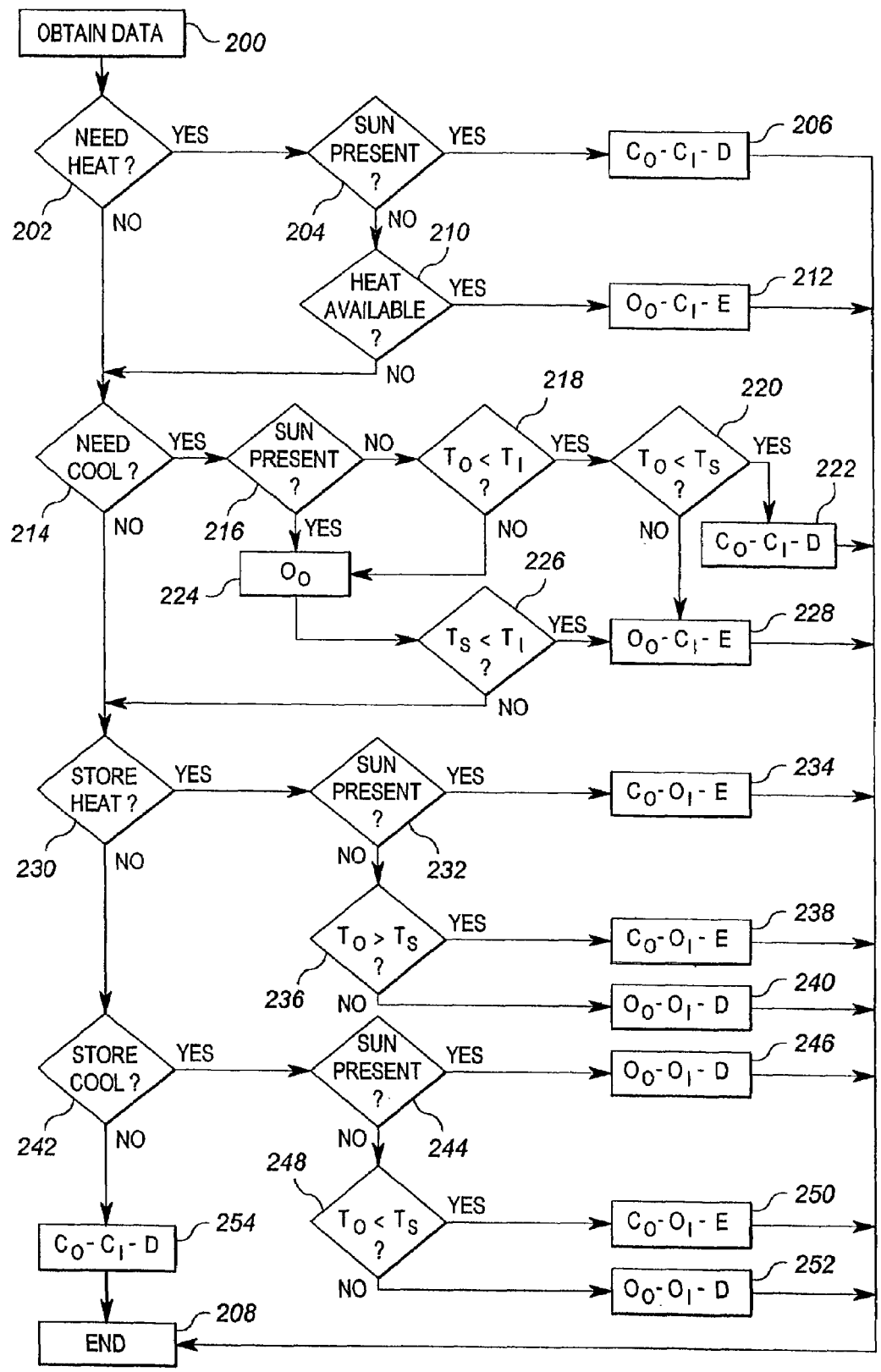
FIG. 5 shows a flow diagram of an exemplary set of operations that may be used to control the window comfort system of FIG. 3.

Exemplary operation of the window comfort system 96 is explained with reference to FIGS. 3-5. Initially, at the step 200 of FIG. 5, the hub module 84 obtains data that will be used to determine the operation of the window comfort system. The sensor module 88 provides the outside temperature and an indication as to whether or not the sun is detected by the sensor module 88. The sensor module 86 provides the current temperature of the thermal energy storage device 100. The inside temperature may be determined by the hub module 86. Alternatively, the inside temperature may be provided by another comfort control MEMS network such as the functional control subsystem 18.

The hub module 86 further obtains from the building control network data indicating whether energy is expected to be expended primarily on heating or on cooling. This data may be provided by the supervisory computer on a scheduled basis and stored in the memory of the hub module 86 for use. Advantageously, any of the data utilized by the hub module 86 may be provided through the building control network. Thus, if the sensor module 88 becomes inoperative, data from a window control subsystem located on the same side of the building as the window 102 is easily directed to the hub module 86.

Continuing at the step 202, the hub module 86 determines whether or not the room adjacent to the window needs to be heated. If heat is needed, then at the step 204 the hub module 86 determines if the sun has been detected by the sensor module 88. If sunlight is present, then the hub module 86 signals the activation modules 90 and 92 to allow sunlight to pass completely through the window 102.

Thus, at the step 206, the activation modules 90 and 92 control the layers 106 and 104 to a transparent or clear state ($C_O$ and $C_I$, respectively). The hub module 86 further signals the pump control module 94 to de-energize the pump 98. Accordingly, the pump control module 94 controls the pump 98 to a de-energized state (D). The control cycle then ends at the step 208. In the $C_O$-$C_I$-D window system configuration, sunlight passes through the window 102 to provide heat to the inside of the building. Additionally, the thermal fluid within the thermal fluid chamber 108 is heated and radiant heat is transferred through the layer 104 to the inside of the building.

If at the step 204 the sun is not present, then the hub module 84 determines whether or not the thermal energy storage device 100 is warmer than the temperature inside of the building at the step 210 by comparing the data received from the sensor module 86 to the inside temperature measured by or provided to the window control subsystem 24. If the thermal energy storage device 100 is warmer than the temperature inside of the building, then there is heat available. Accordingly, at the step 212, the layer 106 is set to opaque ($O_O$), the layer 104 is set to a clear state ($C_I$), the pump 98 is energized (E) and the process ends at the step 208.

In the $O_O$-$C_I$-E configuration, thermal energy is transferred between the thermal energy storage device 100 and the window 102. Since the layer 106 is opaque, the layer 106 acts as an insulator. Since the layer 104 is clear, it acts as a conductor. Thus, because the thermal energy storage device 100 is warmer than the air inside of the building, heat flows from the thermal energy storage device 100 through the thermal fluid into the building through the layer 104.

In the event the thermal energy storage device 100 is not warmer than the air inside of the building, then the window comfort system 96 does not provide any heat to the building and the hub module 84 proceeds to the step 214. Likewise, if the building does not need heat at the step 202, the hub module 84 proceeds to the step 214. At the step 214, the system determines whether or not the building needs to be cooled. If so, then at the step 216 the system determines whether or not the sun is present in the same manner discussed above with respect to the step 204.

If the sun is not present, then the hub module 84 compares the inside and outside temperature at the step 218. If the outside air temperature is cooler than the inside air temperature ($TO<T_I$), the hub module 84 determines the greatest amount of cooling available by comparing the outside temperature to the temperature of the thermal energy storage device at the step 220. In general, the larger temperature difference will result in the greatest transfer of heat energy. Therefore, if the outside air temperature is lower than the temperature of the thermal energy storage device 100 ($T_O<T_S$), then at the step 222, the layers 104 and 106 are set to a clear state (C), the pump 98 is de-energized (D) and the process ends at the step 208.

In the $C_O$-$C_I$-D configuration with no sunlight, the primary thermal transfer will be through convection. Thus, because the outside air temperature is lower than the inside temperature and the layers 104 and 106 are configured to conduct energy, heat from the building will pass through the layers 104 and 106 and the building will be cooled.

In the event sunlight is present at the step 216, the window comfort system 96 in this embodiment is programmed to set the layer 106 to opaque ($O_O$) at the step 224 so as to reflect the sunlight away from the building. Similarly, if the outside air temperature was warmer than the inside air temperature at the step 218, then the layer 106 is set to the opaque state at the step 224 so as to provide insulation. In either event, the hub module 84 then continues to the step 226.

At the step 226, the hub module 84 determines whether or not the thermal energy storage device 100 is cooler than the temperature inside of the building. If the thermal energy storage device 100 is cooler than the air inside of the building, then heat energy may be transferred from the building. Accordingly, at the step 228, the layer 106 is set to opaque ($O_O$), the layer 104 is set to a clear state ($C_I$), the pump 98 is energized (E) and the process ends at the step 208.

In the $O_O$-$C_I$-E configuration, thermal energy is transported from the thermal energy storage device 100 to the window 102. Since the layer 106 is opaque, the layer 106 acts as an insulator. Since the layer 104 is clear, it acts as a conductor. Thus, because the thermal energy storage device 100 is cooler than the inside air, heat flows from the building through the layer 104 into the thermal fluid and then to the thermal energy storage device 100.

In the event that the window comfort system 96 is not actively heating or cooling the building, the hub module 84 determines whether or not the window comfort system 96 can be recharged. At the step 230, the hub module 84 determines if the predominant need over some upcoming span of time will be heat. The manner in which this is accomplished may be based solely upon a calendar. Alternatively, more sophisticated programs may be used that incorporate weather predictions. In any event, if the perceived need is for additional heat and at the step 232 it is determined that sunlight is present, then at the step 234 the layer 106 is set to clear ($C_O$), the layer 104 is set to opaque ($O_I$), the pump 98 is energized (E) and the process ends at the step 208.

In the $C_O$-$O_I$-E configuration, thermal energy is transferred between the thermal energy storage device 100 and the window 102. Since the layer 106 is clear and there is sunshine, the thermal fluid will become heated in the thermal fluid chamber 108. This heat is then transferred to the thermal energy storage device 100 as the thermal fluid is pumped through the thermal energy storage device 100. Moreover, since the layer 104 acts as a reflector, additional heat is reflected back into the thermal fluid chamber 108. The layer 104 also provides insulation for the building to reduce transfer of heat from the thermal fluid into the building.

If at the step 232 the hub module 84 determines that there is no sunlight, the system will still be recharged if at the step 236 the outside air temperature is determined to be above the temperature of the thermal energy storage device 100. Accordingly, at the step 238, the layer 106 is set to clear ($C_O$), the layer 104 is set to opaque ($O_I$), the pump 98 is energized (E) and the process ends at the step 208.

In the $C_O$-$O_I$-E configuration, thermal energy is transported between the thermal energy storage device 100 and the window 102. Since the layer 106 is clear, the layer 106 acts as a conductor. Since the layer 104 is opaque, it acts as an insulator. Thus, since the outside air temperature is warmer than the temperature of the thermal energy storage device 100, heat energy is transferred from the outside of the building through the layer 106 into the thermal fluid and to the thermal energy storage device 100.

If the outside air temperature is less than the temperature of the thermal energy storage device 100, then there is no heat energy available to store in the thermal energy storage device 100. Accordingly, at the step 240, the layer 106 is set to opaque ($O_O$), the layer 104 is set to opaque ($O_I$), the pump 98 is de-energized (D) and the process ends at the step 208. This provides maximum insulating characteristics as both the layer 104 and the layer 106 are configured as insulators.

In the event that the predominant need over some upcoming span of time will not be heat, the hub module 84 proceeds to the step 242 and determines if cooling will be needed. If the perceived need is for additional cooling but at the step 244 it is determined that the sun is present, then the window comfort system 96 will not be charged. Accordingly, at the step 246 the layer 106 is set to opaque ($O_O$), the layer 104 is set to opaque ($O_I$), the pump 98 is de-energized (D) and the process ends at the step 208. This provides maximum insulating characteristics as both the layer 104 and the layer 106 are configured as insulators.

If at the step 244 the hub module 84 determines that there is no sunlight, the system determines if the outside air temperature is below the temperature of the thermal energy storage device 100 at the step 248. If so, then at the step 250, the layer 106 is set to clear ($C_O$), the layer 104 is set to opaque ($O_I$), the pump 98 is energized (E) and the process ends at the step 208.

In the $C_O$-$O_I$-E configuration, thermal energy is transported between the thermal energy storage device 100 and the window 102. Since the layer 106 is clear, the layer 106 acts as a conductor. Since the layer 104 is opaque, it acts as an insulator. Thus, since the outside air temperature is less than the temperature of the thermal energy storage device 100, heat energy is transferred from the thermal energy storage device 100 to the thermal fluid and passes through the layer 106 to the outside of the building.

If the outside air temperature is greater than the temperature of the thermal energy storage device 100, then the heat energy available in the thermal energy storage device 100 cannot be discharged. Accordingly, at the step 252, the layer 106 is set to opaque ($O_O$), the layer 104 is set to opaque ($O_I$), the pump 98 is de-energized (D) and the process ends at the step 208. This provides maximum insulating characteristics as both the layer 104 and the layer 106 are configured as insulators.

If there is no heating or charging, and no instructions to charge the window comfort system 96, then at the step 254 the layer 106 is set to clear ($C_O$), the layer 104 is set to clear ($C_I$), the pump 98 is de-energized (D) and the process ends at the step 208.

While a method was set forth above with respect to a window system, the present invention may be applied to other building components. For example, the building envelope, which includes the outer walls and outer ceilings, and inner walls, ceilings and floors of a building, may be controlled in a similar fashion. Thus, heat generated by equipment within a building may be used while reducing over-heating of adjoining spaces.

Additionally, other physical characteristics of components may be controlled. By way of example, the porosity of wall may be controlled so as to allow ventilation or to provide insulation by the incorporation of MEMS modules incorporating valves such as those disclosed in U.S. Patent Application Pub. No. 2003/0058515. Alternatively, MEMS modules acting as louvers as disclosed in U.S. Pat. No. 6,538,796 B1 may be used to expose a substrate with a desired physical characteristic.

The state of the window may also be controlled in response to other sensed conditions. For example, if a projector or television is being used, a window control subsystem may be configured to sense such use and to control the windows to an opaque state. In yet another application, a window may be controlled to alert birds to the presence of a window. In such applications, the approach of a bird may be detected by a motion detector using a MEMS module and the window control subsystem may change the reflective nature of the window to alert the bird as to the presence of the window. Alternatively, the window control subsystem may cause a noise to be emitted to alert the bird as to the presence of the window.

Moreover, integrated distributed MEMS based control systems are not limited to building control systems. By way of example, in an application wherein a bank of DTPs are available to service a particular area, a performance MEMS module network may be used to control and monitor the efficiency and operating parameters of a particular DTP within the bank of DTPs and to report the efficiency and operating parameters to a DTP control network. A DTP control module within the DTP control network would then determine, based upon inputs from all of the performance MEMS module networks, which devices from the bank where to be in use to most efficiently service the area. Thus, integrated distributed MEMS based control systems may be used control machinery.

In the above embodiment, an integrated distributed MEMS based control system provides the benefit of increased reliability because a number of sensors are available within a functional control network. Additional reliability and flexibility is realized because the functional networks are integrated. Thus, as was discussed, in the event of a sensor failure, data obtained by a sensor in a first functional network may be shared with a second functional network. This is a particularly powerful capability in that the data need not be shared solely between functional networks of the same type as discussed with reference to FIG. 6.

Figures 6, 7:
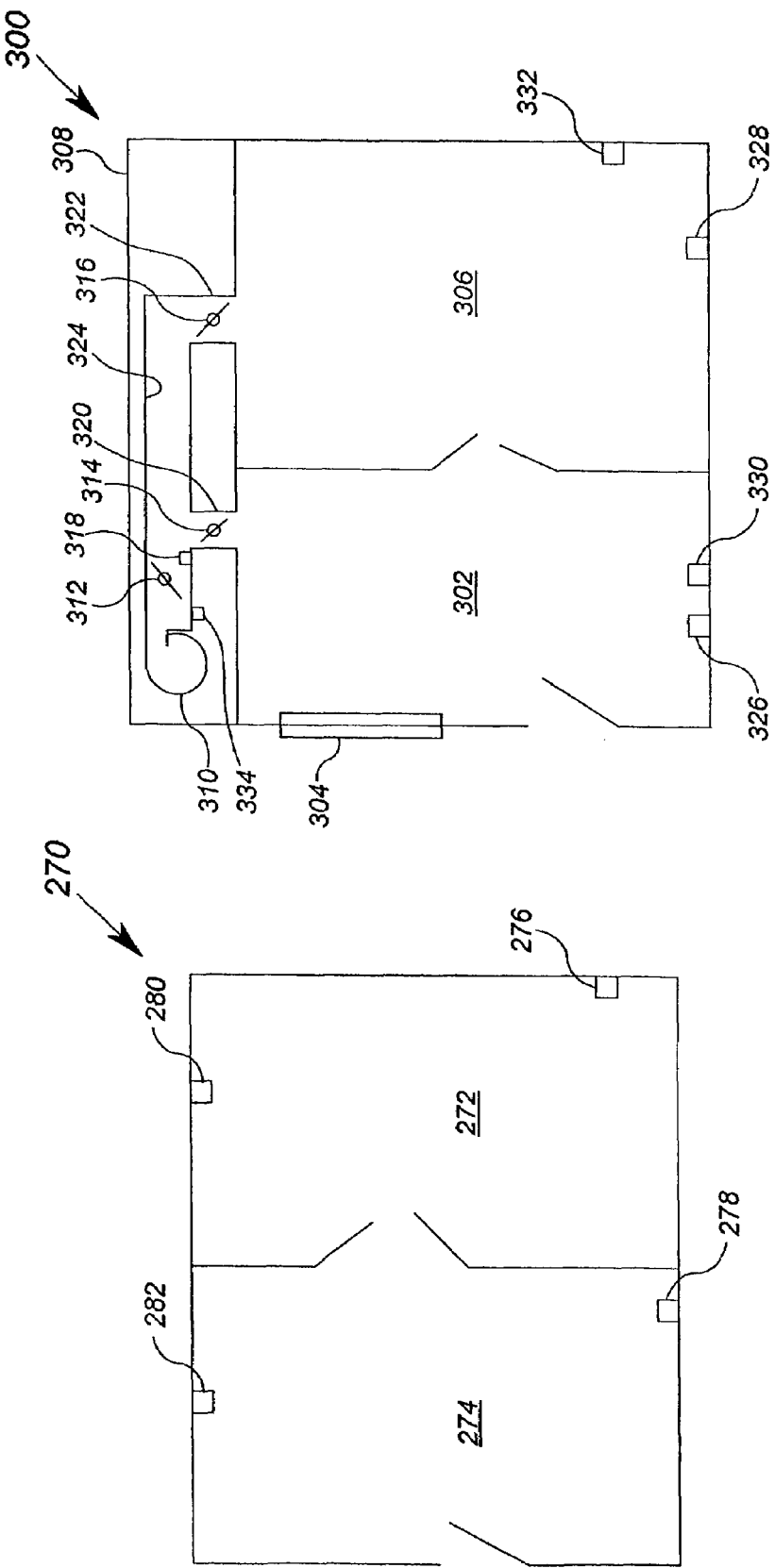
FIG. 6 shows a top view floor plan of an area with security and comfort hub modules in two micro areas.
FIG. 7 shows a top view floor plan of an area including a simplified ventilation system providing ventilation to two micro areas.

Referring to FIG. 6, a building 270 includes a conference room 272 and an open area 274. A security MEMS module network is provided in each of the conference room 272 and the open area 274 as represented by the security hub modules 276 and 278, respectively. A performance MEMS module network is further provided in each of the conference room 272 and the open area 274 as represented by the performance hub modules 280 and 282, respectively. All of the performance and security MEMS module networks are integrated into a building control network (not shown).

As individuals enter into the open area 274, the security MEMS module network in the open area 274 detects the individuals and provides this data to the security hub module 278. The presence and/or identification of the individuals is reported to the building control network for use in tracking the particular individuals.

The data is also passed through the building control network to the performance hub module 282. This data indicates to the performance hub module 282 that heat sources have been added to the open area 274 and that oxygen is being consumed at a higher rate. Accordingly, the performance hub module 282 modifies the controlled flow of conditioned air into the open area 274 to maintain the desired temperature and to ensure proper oxygen levels.

As individuals pass from the open area 274 into the conference room 272, the security MEMS module network in the area 274 detects the departures and the security hub module 278 provides this data to the building control network for use in tracking the individuals. The data is also provided to the security hub module 276 and the performance hub modules 280 and 282. Accordingly, the security hub module 276 is prepared to continue to track the individuals. At the same time, the performance hub module 280 makes adjustment for the additional load represented by the presence of additional individuals while the performance hub module 282 adjusts for the reduction in load resulting from the departure of the individuals.

Accordingly, by providing data not only between functional networks of the same type but also of different types, a number of synergistic results may be realized.

Obviously, as the number and variety of sensors increases, the complexity of managing the building control system also increases. Moreover, the amount of data that is available to the building control network also increases. By modeling the building control system and associating the inputs from the various elements of the building control systems in a building system model, the building control system may be easily managed and the generated data may be used for more than just autonomous control functions. An acceptable building control modeling method and apparatus is discussed with reference to the exemplary building zone 300 in FIG. 7.

FIG. 7 shows a top view of a building area 300 that includes an open space 302, a window 304, a room space 306, and mechanical space 308. The mechanical space 308 is illustrated as being adjacent to the spaces 302 and 306 for clarity of exposition, but in actuality would also typically extend over the top of the open space 302 and the room space 306.

The portion of the HVAC system shown in FIG. 7 includes a blower 310, a shaft damper 312, an open space damper 314, a room space damper 316, a flow sensor 318, an open space inlet 320, a room space inlet 322, a shaft branch 324, a first comfort MEMS module network represented by the comfort hub module 326 and a second comfort MEMS module network represented by the comfort hub module 328. Also shown in FIG. 7 are two security MEMS module networks represented by the security hub modules 330 and 332 and a performance MEMS module network represented by the performance hub module 334. The building system has further control elements and networks that are not illustrated in FIG. 7, some of which are represented schematically in FIG. 8, which is discussed further below.

Referring to the structure of the HVAC system of FIG. 7, the blower 310 is a mechanical device well known in the art that is configured to blow air through the shaft branch 324, as well as other similar shaft branches, not shown. The shaft branch 324 extends adjacent to the spaces 302 and 306. The open space inlet 320 extends from a portion of the shaft branch 324 toward the open space 302 and is in fluid communication with the open space 302. The open space damper 314 is disposed in the open space inlet 320 and operates to controllably meter the flow of air from the shaft branch 324 to the open space 302.

Similarly, the room space inlet 322 extends from another portion of the shaft branch 324 toward the room space 304 and is in fluid communication with the room space 306. The room space damper 316 is disposed in the room space inlet 322 and operates to controllably meter the flow of air from the shaft branch 324 to the room space 306. The shaft damper 312 is arranged in the shaft branch 324 to meter the overall air flow through the shaft branch 324.

Figure 8:
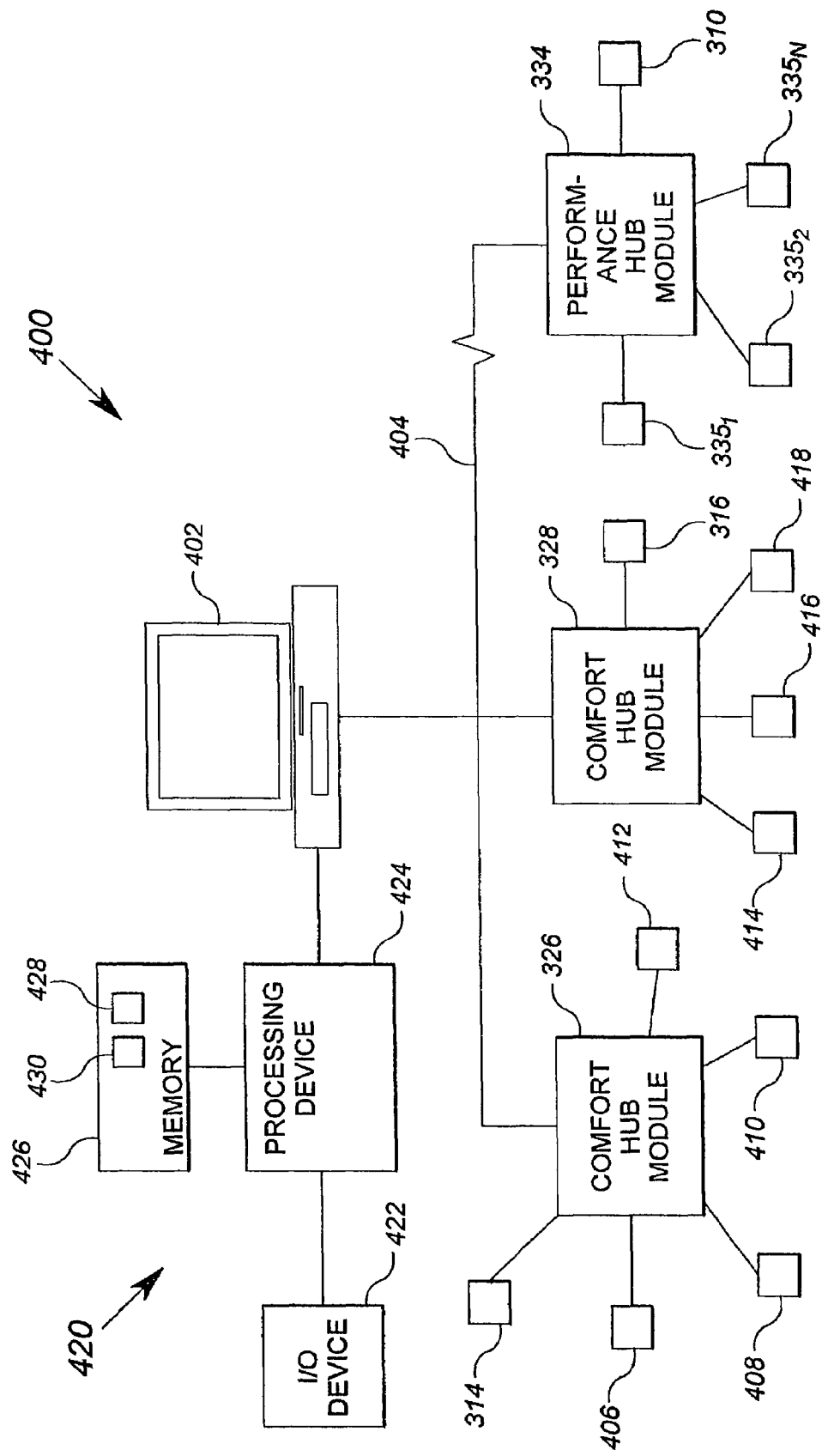
FIG. 8 shows a schematic diagram of a modeling system and an integrated distributed building control network used to control various components of FIG. 7.

FIG. 8 shows a schematic representation of the building system 400 that includes electrical control and communication devices as well as some of the HVAC system mechanical elements shown in FIG. 7. The building system 400 includes a control station 402, a building control network 404, the comfort hub module 326, the comfort hub module 328, and the performance hub module 334. The control station 402 is a device that provides status monitoring and control over various aspects of the building system 400. The building control network 404 is a communication network that allows communication between the hub modules, as well as other devices not depicted in FIG. 8, in the manner discussed above with reference to FIG. 1.

In the embodiment shown in FIG. 8, the comfort hub module 326 is operable to generate an output that causes the open space damper 314 to open or close in response to temperature sensor values received from the comfort MEMS modules 406, 408, 410 and 412. The comfort module 326 is further operable to receive the set point temperature value from an integral temperature adjuster or via the building control network 404.

The comfort hub module 326 is also operable to communicate to other functional control subsystem networks. To this end, the comfort hub module 326 is operable to communicate with the comfort hub module 328 and the performance hub module 334 over the building control network 404. Thus, for example, the comfort hub module 326 is operable to communicate sensor values generated by the MEMS modules 406, 408, 410 and 412 to the control station 402 and/or the other hub modules 328 and 334. Alternatively and/or additionally, the comfort hub module 326 may provide processed data over the building control network 404.

The other comfort hub module 328 is similarly operable to generate an output that causes the room space damper 316 to open or close in response to one or more sensor signals and set points. To this end, MEMS modules 414, 416 and 418 form a comfort MEMS module network with the comfort hub module 328.

The performance hub module 334 is operable to generate an output that causes the blower 310 to energize or de-energize in response to one or more sensor signals and set points. To this end, MEMS modules $335_1$, and $335_2$ through $335_n$ form a performance MEMS module network with the performance hub module 334.

In accordance with the present invention, a modeling system 420 for developing and storing a model of the building system 400 is operably connected to communicate to the control station 402. Such a connection may be through an intranet, the Internet, or other suitable communication scheme. In alternative embodiments, the modeling system 420 and the control station 402 are present on the same host computer system.

In any event, the modeling system 420 includes I/O devices 422, a processing circuit 424 and a memory 426. The I/O devices 422 may include a user interface, graphical user interface, keyboards, pointing devices, remote and/or local communication links, displays, and other devices that allow externally generated information to be provided to the processing circuit 424, and that allow internal information of the modeling system 420 to be communicated externally.

The processing circuit 424 may suitably be a general purpose computer processing circuit such as a microprocessor and its associated circuitry. The processing circuit 424 is operable to carry out the operations attributed to it herein.

Within the memory 426 is a model 428 of the building system 400 and a library of templates 430. The model 428 is a collection of interrelated data objects representative of, or that correspond to, elements of the building system 400. Elements of the building system may include any of those elements illustrated in FIGS. 7 and 8, as well as other elements typically associated with building systems. Building system elements are not limited to HVAC elements, and preferably include security devices, fire safety system devices, lighting equipment, and other machinery and equipment.

Figure 9:
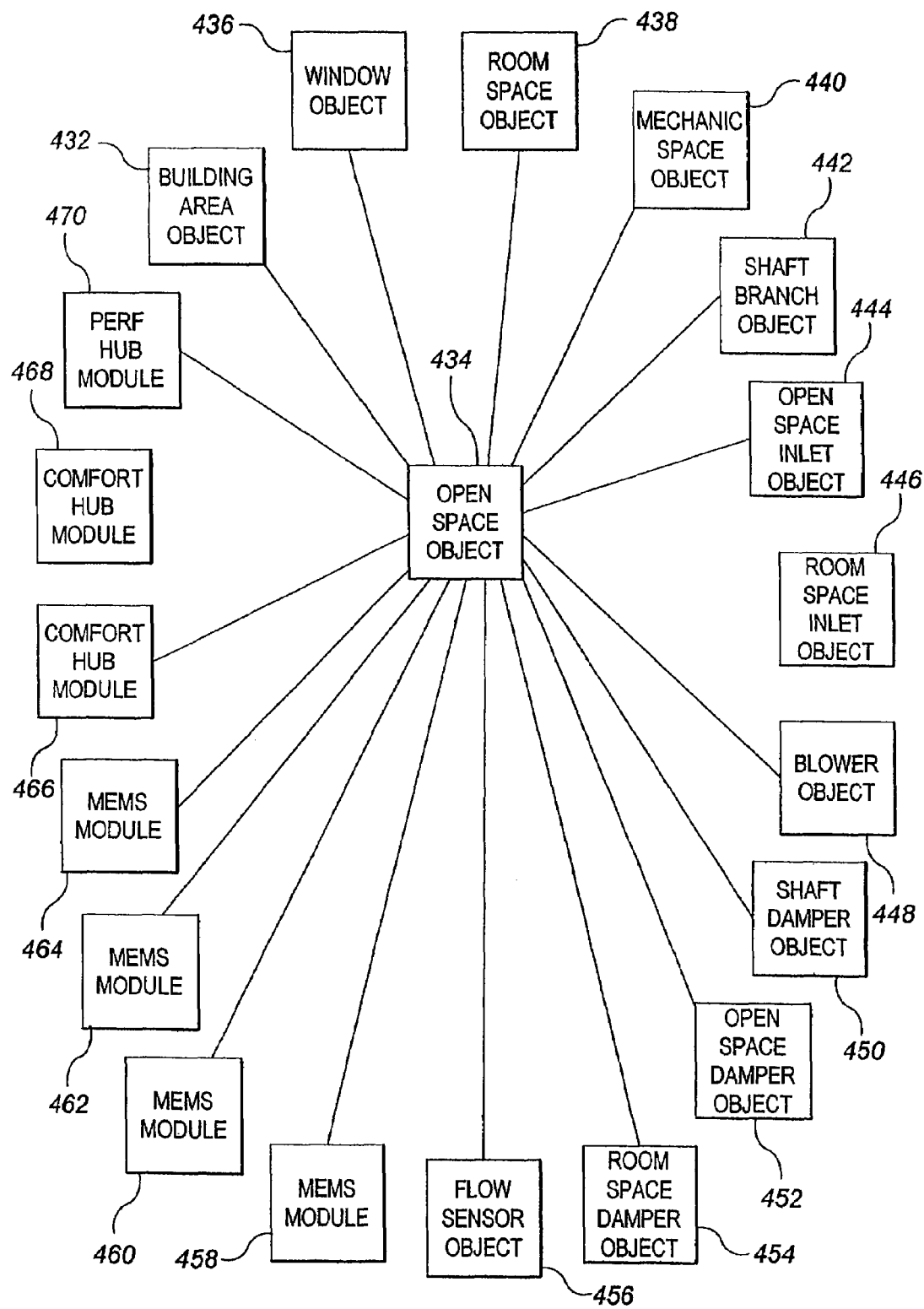
FIG. 9 shows the interrelationships between an object representing the open space of FIG. 7 and objects for other components of FIG. 7.

A partial example of the model 428 of the building system 400 of FIGS. 7 and 8 is illustrated in FIG. 9 in further detail. With reference to FIG. 9, the model 428 includes a building area object 432, an open space object 434, a window object 436, a room space object 438, a mechanical space object 440, a shaft branch object 442, an open space inlet object 444, a room space inlet object 446, a blower object 448, a shaft damper object 450, an open space damper object 452, a room space damper object 454, a flow sensor object 456, a first, second, third, and fourth comfort MEMS module object 458, 460, 462 and 464, respectively, a first comfort hub module object 466, a second comfort hub module object 468, and a performance hub module object 470.

The objects generally relate to either primarily physical building structures or building automation system devices. Building structure (or space) objects correspond to static physical structures or locations within a building space, such as room spaces, hall spaces, mechanical spaces, and shaft elements. Building automation system device objects correspond to active building automation system elements such as sensors, dampers, controllers and the like. It is noted that some elements, such as ventilation shaft elements, could reasonably qualify as both types of elements in other embodiments. However, in the exemplary embodiment described herein, the shaft elements are considered to be building structure elements as they tend to define a subspace within the building space.

Each object in the model 428 corresponds to an element of the building system of FIGS. 7 and 8. Table 1, below lists the above identified exemplary objects, and defines the element of the building system to which they correspond.

TABLE 1

| OBJECT No. | CORRESPONDING ELEMENT |
|---|---|
| 432 | building area 300 |
| 434 | open space 302 |
| 436 | window 304 |
| 438 | room space 306 |
| 440 | mechanical space 308 |
| 442 | shaft branch 324 |
| 444 | open space inlet 320 |
| 446 | room space inlet 322 |
| 448 | blower 310 |
| 450 | shaft damper 312 |
| 452 | open space damper 314 |
| 454 | room space damper 316 |
| 456 | flow sensor 318 |
| 458 | comfort MEMS module 406 |
| 460 | comfort MEMS module 408 |
| 462 | comfort MEMS module 410 |
| 464 | comfort MEMS module 412 |
| 466 | comfort hub module 326 |
| 468 | comfort hub module 328 |
| 470 | performance hub module 334 |

Each object is a data object having a number of fields. The number and type of fields are defined in part by the type of object. For example, a room space object has a different set of fields than a MEMS module object. A field usually contains information relating to a property of the object, such as a description, identification of other related objects, and the like.

The lines between the various objects in FIG. 9 denote the existence of a relationship between the respective elements and the open space 302. For example, the line connecting the building area object 432 and the open space object 434 is shown because the open space 302 is located within the building area 300. The window object 436 is connected because the window 304 is located within the open space 302. The room space object is connected because the room space 306 is adjacent to the open space 302 and also because each space is accessible from the other. The room space damper object 454 is connected because the position of the room space damper 316 will affect the amount of air from the blower 310 that is available for use in the open space 302. The relationship may be, but need not be, expressly identified within the object. By way of example, so long as the location of the open space 302 and the room space 306 within the building area 300 are identified, the model 428 will be able to identify the open space 302 as being adjacent to the room space 306.

The use of object oriented modeling thus allows for a rich description of the relationship between various objects, only a few of which are shown in the FIG. 9. For example, the open space 302 may further be identified by its position above or below other portions of the building and/or equipment in those portions of the building. To this end, the location of each of the elements within the building envelope is defined in the object associated with that element.

The model 428 is built by creating objects from the library of templates 430 (see FIG. 8), which in this embodiment are stored in the memory 426. The library of templates 460 contains templates for several types of objects, and ideally for all types of objects in the model 428. The templates thus include building area templates, room space templates, inlet shaft segment templates, MEMS module templates and damper templates. Other templates for other elements may be developed by those of ordinary skill in the art applying the principles illustrated herein.

Figure 10:
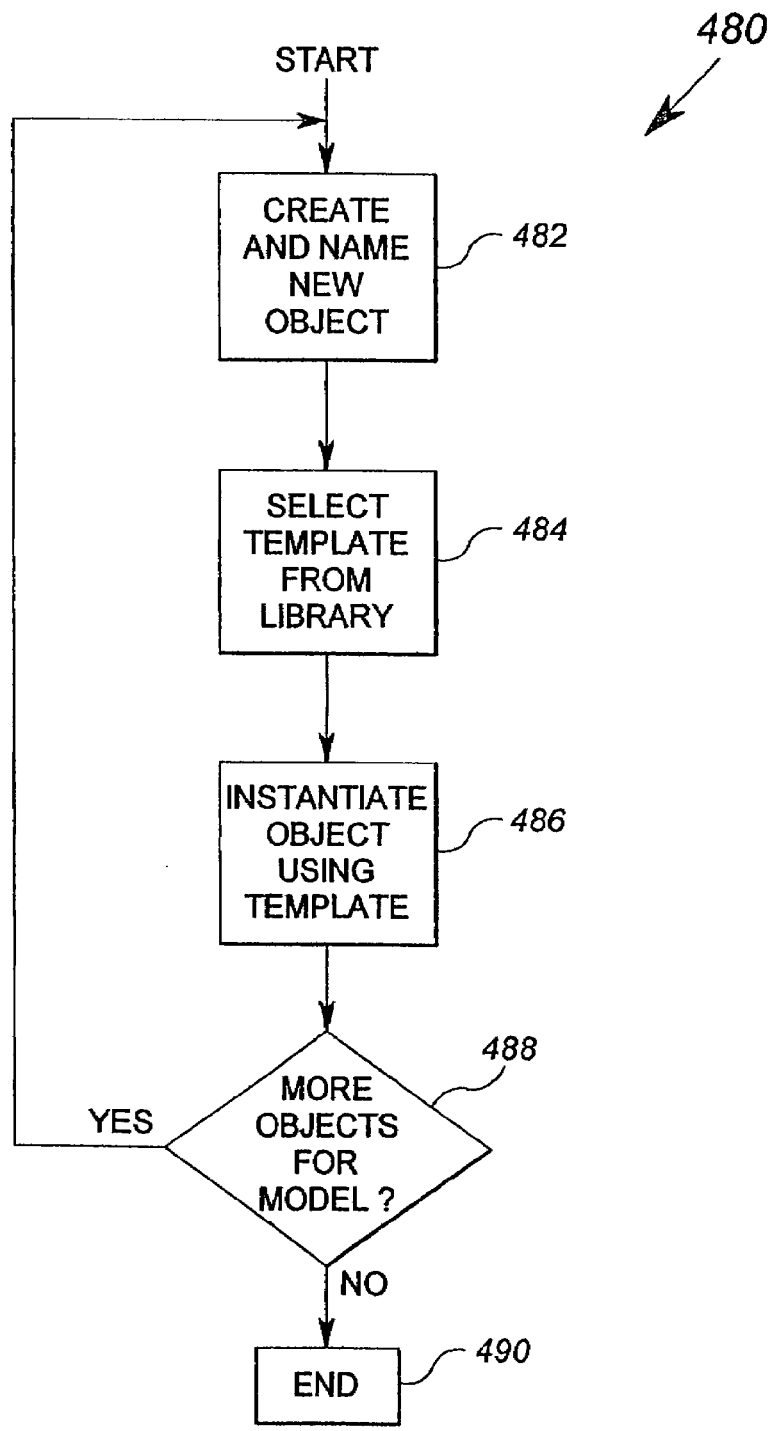
FIG. 10 shows a flow diagram of an exemplary set of operations performed to generate a model in accordance with aspects of the invention.

FIG. 10 shows an exemplary method 480 that may be used to generate a model such as the model 428. In step 482, the user generates a new object for a selected building system element, and gives the object an identification value or name. To this end, the user may enter information through the I/O device 442 of the system 420 of FIG. 8.

Thereafter, in step 484, the user selects an object template corresponding to the selected building system element. To this end, the processing circuit 424 may cause the I/O device 422 to display one or more menus of templates available from the template library 430 stored in the memory 426. The user may then use the I/O device 422 to enter a selection, which is received by the processing circuit 424.

Then, in step 486, the user instantiates the selected object template by providing appropriate values to the fields available in the object template. To this end, the processing circuit 424 may suitably prompt the user for each value to be entered as defined by the selected template. The types of values entered will vary based on the type of template. Building structure templates vary, but share some similarities, as do building automation device templates.

Once the object is instantiated, the processing circuit 424 stores the object in the memory 426 in a manner that associates the object with the model 428. In step 488, the user may select whether additional objects are to be created. If additional objects are to be created, the user creates and names a new object in step 482 and proceeds as described above. Once all objects have been created, then the process is completed at step 490.

Examples of templates, and how such templates could be populated or instantiated using some of the data of the building system of FIGS. 7 and 8, are provided below in connection with FIGS. 11-13. It will be appreciated that the objects may suitably take the form of an XML object or file.

Figure 11:
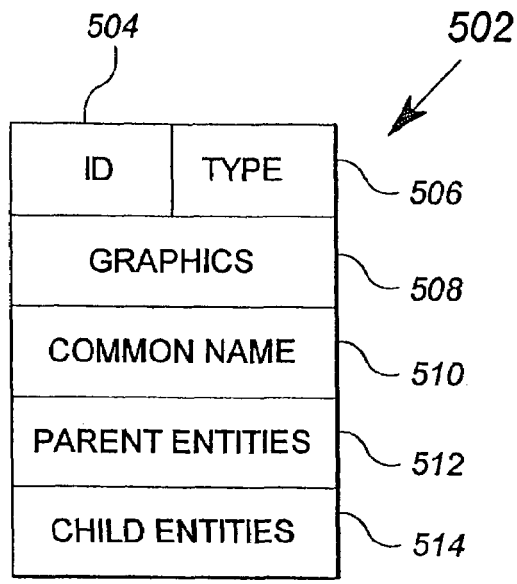
FIG. 11 shows a block diagram of a building area template for use in generating building zone objects in a model according to an embodiment of the invention.

FIG. 11, for example, shows a building area template 502. When the user creates an object for the building area 300 of the building system of FIGS. 7 and 8, the user employs the building area template 502. The building area template 502 in the exemplary embodiment described herein has an identifier value 504, a type identifier 506, and at least four fields: a graphics field 508, a common name field 510, a parent entity field 512, and a child entity field 514.

The graphics field 508 contains a pointer to a graphics file. The graphics file identifies a virtual three dimensional model of the area. The common name field 510 is a string. The common name field 510 could contain a commonly known name for the building area, such as the "first floor", or "eastern wing". Thus, the building area template 502 provides two ways to identify the building: the system object identifier and the common name.

The data structure for the parent entity field 512 may suitably be a single value or it may be structured in the same manner as the child entity field 514 discussed below. The value of the parent field 512 may suitably be the identifier for the building object of the building in which the building area is located. For example, the building area 300 of FIG. 7 may be a floor or wing of a building, and thus its parent object is the object for the entire building.

The data structure contained in, or pointed to by the value in, the primary child field 514 is an array. Each element of the array is an identifier value for child entities of the building, such as room spaces, hall spaces and the like. The identifier value may suitably be the identifier of the object corresponding to those child entities. The child field 514 thus allows the building object to be associated with other objects, namely room space, hall space and other space objects, in the model 428.

Figure 12:
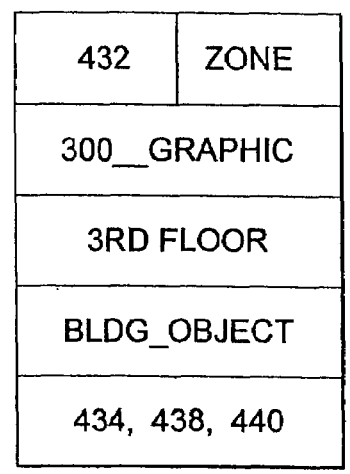
FIG. 12 shows a block diagram of a building area object of a model of the area of FIG. 7 generated from the building area template of FIG. 11.
Figure 13:
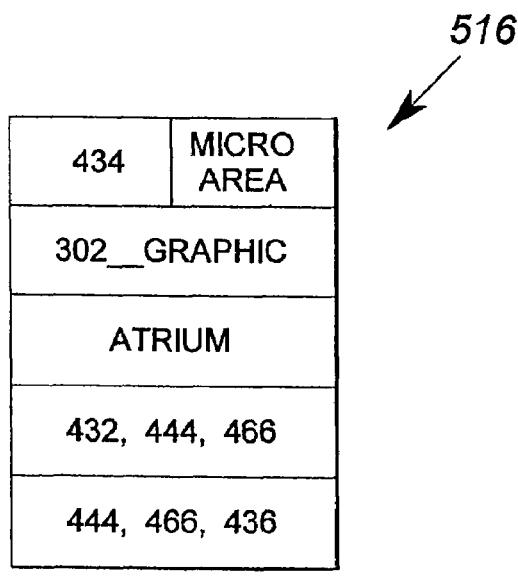
FIG. 13 shows a micro area object in the model of FIG. 12 of a micro area of FIG. 7 that identifies a relationship to the building area object of FIG. 12.

FIG. 12 shows the building object 514 formed by instantiating the building area template 502 with some of the data associated with the area 300. The building object 514 clearly identifies the spaces within the building area as those associated with the open space object 434, the room space object 438 and the mechanical space object 440. It follows that the open space object 434 includes as its parent the building area object 432 as shown in FIG. 13 by the micro area object 516.

The micro area object 516 further reflects that the parent entities of the open space object 434 include the open space inlet object 444 and the comfort hub module 466. These parents indicate that air is provided to the open space 302 from the open space inlet 320 and that the comfort hub module 326 controls the comfort functions within the open space 302.

The micro area object 516 further reflects that the child entities of the open area 302 include the open space inlet object 444, the comfort hub module 466 and the window object 436. This reflects that air is provided to the open space 302 from the open space inlet 320 under the control of the comfort hub module 326 and that the window 304 is located in the open space 302.

Listing the open space inlet object 444 and the comfort hub module 466 as both parent and child facilitates the use of various data base search related products including trouble shooting programs. For example, if a problem exists in the open space 302, the children listed in the object 516 identify systems that may be causing the problem. Conversely, if a problem is originally discovered with the blower 310, the affected spaces are easily identified by following the children listed in the blower object 448.

It will be appreciated that suitable templates may readily be created by those of ordinary skill in the art for other elements, such as, for example, flow sensors and shaft branches, water valve actuators, controllers, and other devices of the building system 300, as extensions of the examples described above. The identity of the parent and child objects may further be coded to assist in computer based searches of the objects.

Thus, for example, all ventilation control electronics may include a pre-fix such as "VCE" identifying the nature of the equipment.

Moreover, it is noted that the types of information desired to be accessible by each object will vary from system to system. However, in an embodiment described herein, one of the potential uses is for building maintenance and staff to obtain single point access to a wide variety of building control system data that was previously only available from a wide variety of locations (and in a wide variety of formats) throughout a facility. To this end, it will be appreciated that the various building objects may suitably carry the following information identified in Table II.

TABLE II (List of Object Data Fields to Facilitate Building Management)

Type of Equipment
Manufacturer
Model Number
Serial Number
Unit Capacity (e.g. chiller tonnage, air handler fan CFN rating, etc.)
Energy Usage
Specification Sheet in PDF or other electronic format
CAD drawings for entire unit
Link to manufacturer's website
Phone number to call for service
Point Name
Date Equipment is placed into Service
Date of Last Preventative Maintenance Tests
Results of Last Preventive Maintenance Tests
Temperature Drop Across a New Cooling Coil When Valve is Fully Open, etc.

The building model 428 thus provides a relatively comprehensive description of each of the building automation system devices, and relates those devices to the physical structure of the building. To this end, the building automation system device objects include, in addition to references to relevant control values of the device, information as to the area of the building in which the device is located. Moreover, relationships between the various objects are not limited to a single hierarchical relationship, allowing for a number of alternative search strategies to be employed. It will be appreciated that the actual data objects may take many forms and still incorporate these features of the invention.

The model 428 and other models incorporating the same general principles have limitless potential for enhancing building automation system services. As an initial matter, modeling may be used to more fully capture data covering the full life-cycle of a physical system. Thus, a single location includes data from the design and procurement stages through installation and operation stages.

Figure 14:
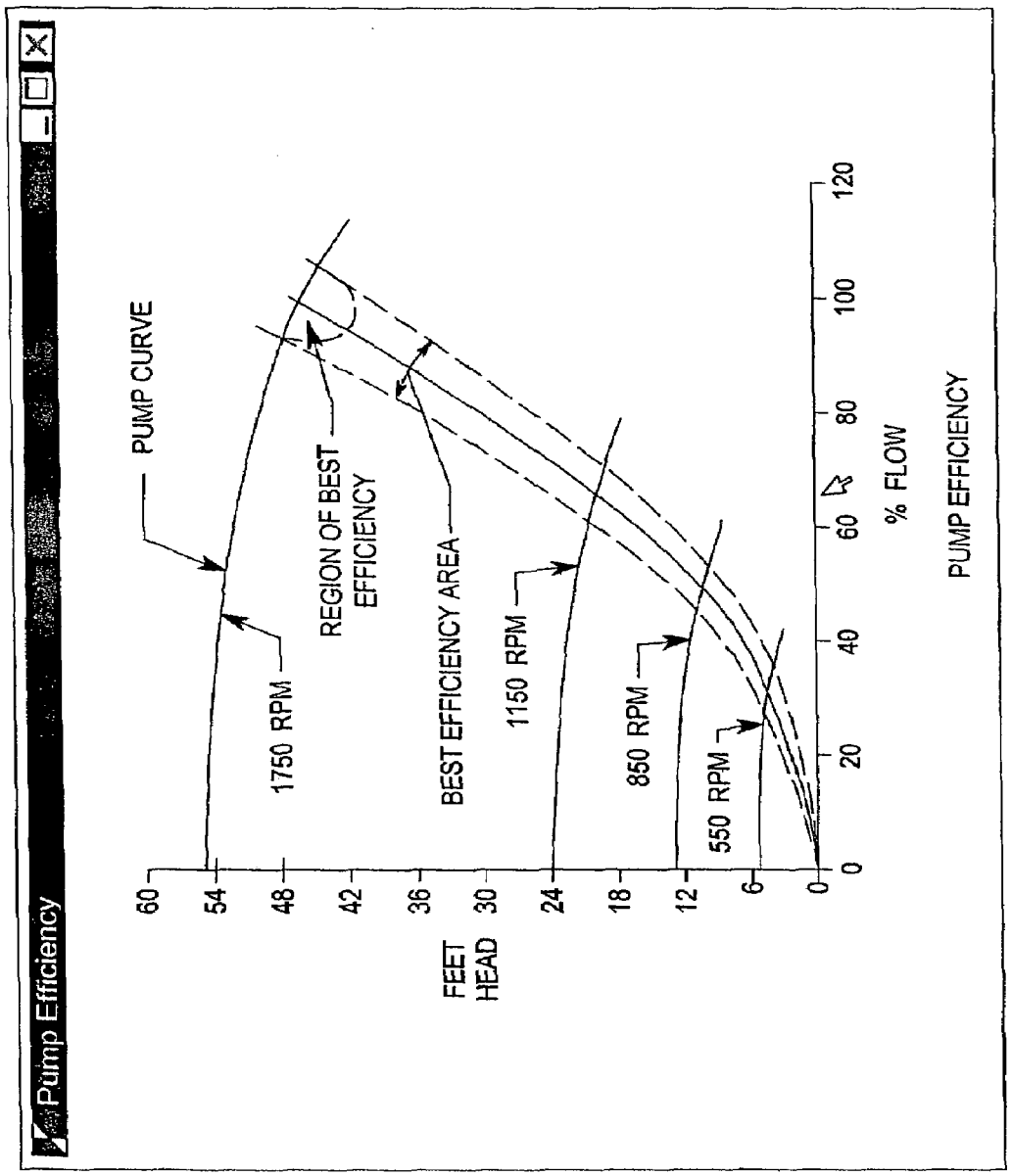
FIG. 14 shows a display of a pump efficiency graph generated by a modeling system in accordance with aspects of the invention.

The data may advantageously include efficiency data such as the pump efficiency graph shown in FIG. 14. This data may further be used by the building control system to improve system efficiency. For example, a performance control subsystem for a chill water system may use various efficiency curves to determine efficient operating parameters for a given load on the system. In such an application, the comfort control subsystems that use the chill water system would provide the performance control subsystem with the data needed to identify the actual load.

Moreover, software applications may use the model 428 to relate building information innumerable ways to provide better understanding and operation of building systems. Such software systems may be used for fault detection, diagnostics, optimization analysis, system performance analysis and trending analysis. The availability of a large amount of data further enables the use of artificial intelligence programs. Such programs may include the use of a neural network, fuzzy logic, probabilistic modeling and reasoning, belief network, chaos theory and parts of learning theory.

The above described data rich modeling and artificial intelligence may further be combined with graphic visualization to greatly enhance the understanding by a user of the potentially enormous amount of data available. Specifically, while prior art systems provide data in response to a query, the data is typically in a numeric form and fails to fully describe a given situation. For example, a user may query the temperature in a particular office. A prior art system may respond to such a query with a single number such as "68". The number fails to identify, however, where in the room the temperature is "68" and what variations in the room are present.

In accordance with the present invention, a modeled distributed integrated control system incorporating MEMS based functional control subsystems may be integrated with a graphics program to provide a data rich visualization of the temperature within a space. One example of the possible use of the modeling system 420 is described with reference to FIG. 15.

Figure 15:
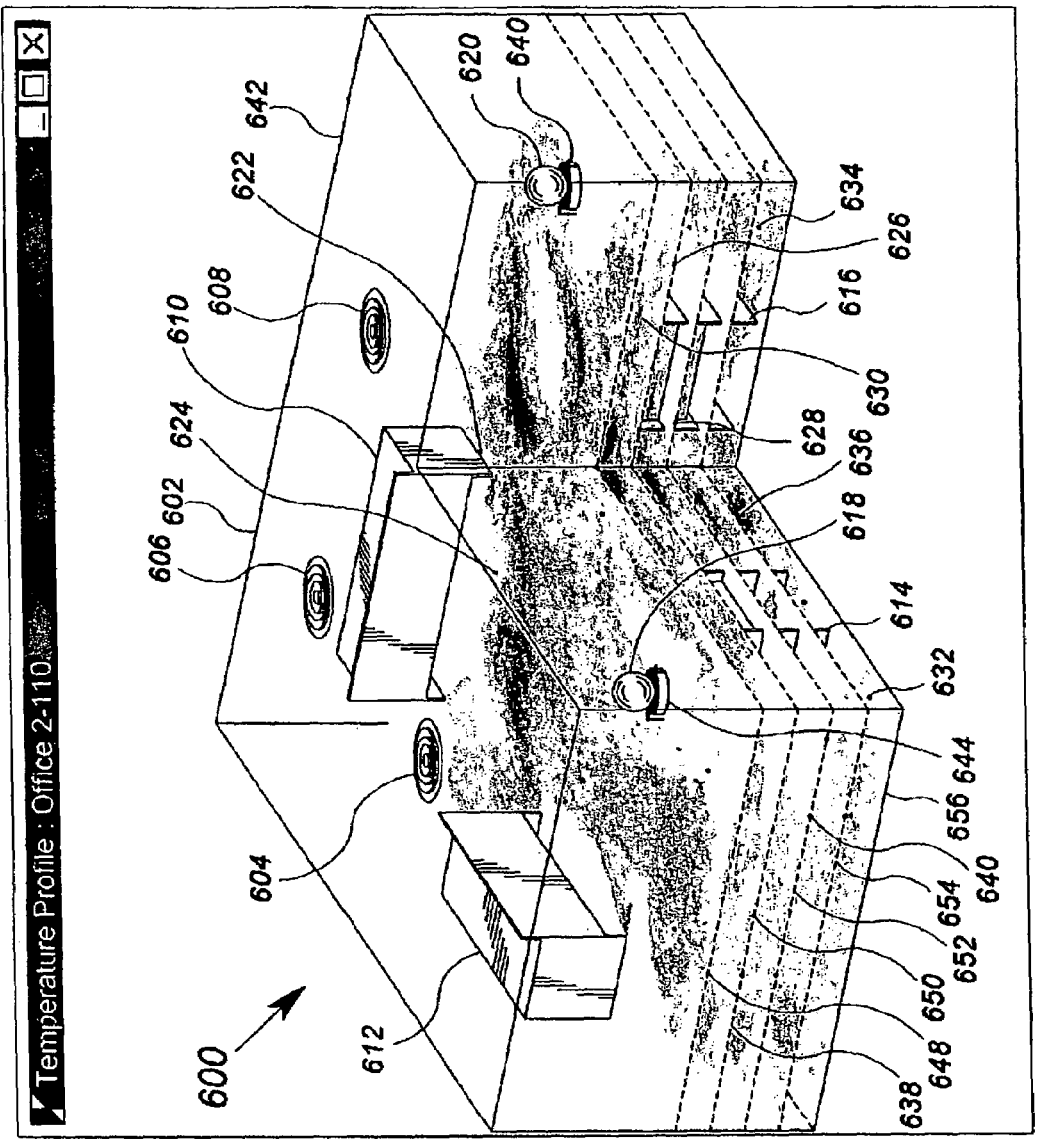
FIG. 15 shows a display of temperature profiles at different levels in a room generated by a modeling system in accordance with aspects of the invention.

FIG. 15 shows a screen display 600 that is displayed to a user in response to a query as to the temperature profile within a particular office. The display 600 depicts the room 602 including three ventilation diffusers 604, 606 and 608, two cabinets 610 and 612, two desks 614 and 616, and two individuals 618 and 620.

The location of the book cases 612 and 614 and the desks 614 and 616 may be manually entered into the modeling system 420. Alternatively, tracking devices may be affixed to the furniture and other equipment and input from a security MEMS module network used to establish the location of the items within the room 602. The position of the individuals 618 and 620 may similarly be established using a security MEMS module network.

Also indicated at various locations throughout the room 602 are a plurality of MEMS modules which form a comfort MEMS control subsystem. The comfort MEMS control subsystem includes MEMS modules 622 and 624 located on the book case 610 and MEMS modules 626, 628 and 630 located on the desk 616. Additionally, MEMS modules 632, 634 and 636 are located on the floor of the room 602 while MEMS modules 638, 640 and 642 are located on the walls of the room 602.

Finally, MEMS modules 644 and 646 are located on the individuals 618 and 620, respectively. The MEMS modules 644 and 646 are thus integrated in the comfort MEMS control subsystem of the room 602 when the individuals 618 and 620 enter the room. Upon departing the room 602, the MEMS modules 644 and 646 are released from the comfort MEMS control subsystem of the room 602. This may be accomplished based upon input from the security MEMS control subsystem of the room 602 showing the departure of the individuals from the room 602.

The display 600 also shows a number of temperature profile slices 648, 650, 652, 654 and 656. To generate the temperature profile slices 648, 650, 652, 654 and 656, the modeling system 420 obtains temperature data from the comfort MEMS control subsystem. The data may either be historical data stored within a memory accessible by the modeling system 420 or the data may be provided in near real time from the comfort MEMS control subsystem. The data includes an identifier of the particular MEMS that sensed the temperature. The modeling system 420 then associates the temperature with the particular spot in the room 602 at which the MEMS module is located.

The modeling system 420 uses the temperature data and the location at which the temperature was sensed to generate a modeled temperature for locations between the data points. The modeled temperature may then be represented in a number of ways. In the FIG. 15, the modeled temperature is shown as the series of temperature profile slices 648, 650, 652, 654 and 656. Each of the temperature profile slices uses a color to depict a particular temperature which is shown in FIG. 15 as a gray scale equivalent. Thus, in display 600 a deep blue color (dark gray) may indicate a temperature below 65 degrees Fahrenheit and a deep red (while color) indicates a temperature above 90 degrees Fahrenheit.

As is evident from the FIG. 15, a user may visually identify areas that need cooling and areas that need additional heat within the room 602. Moreover, it is possible to identify structures and configurations of the ventilation system that may be hindering circulation of air thereby creating localized areas within the room 602 that are too warm or too cold. Thus, a significantly more detailed understanding of the environment within the space 602 is possible.

Figure 16:
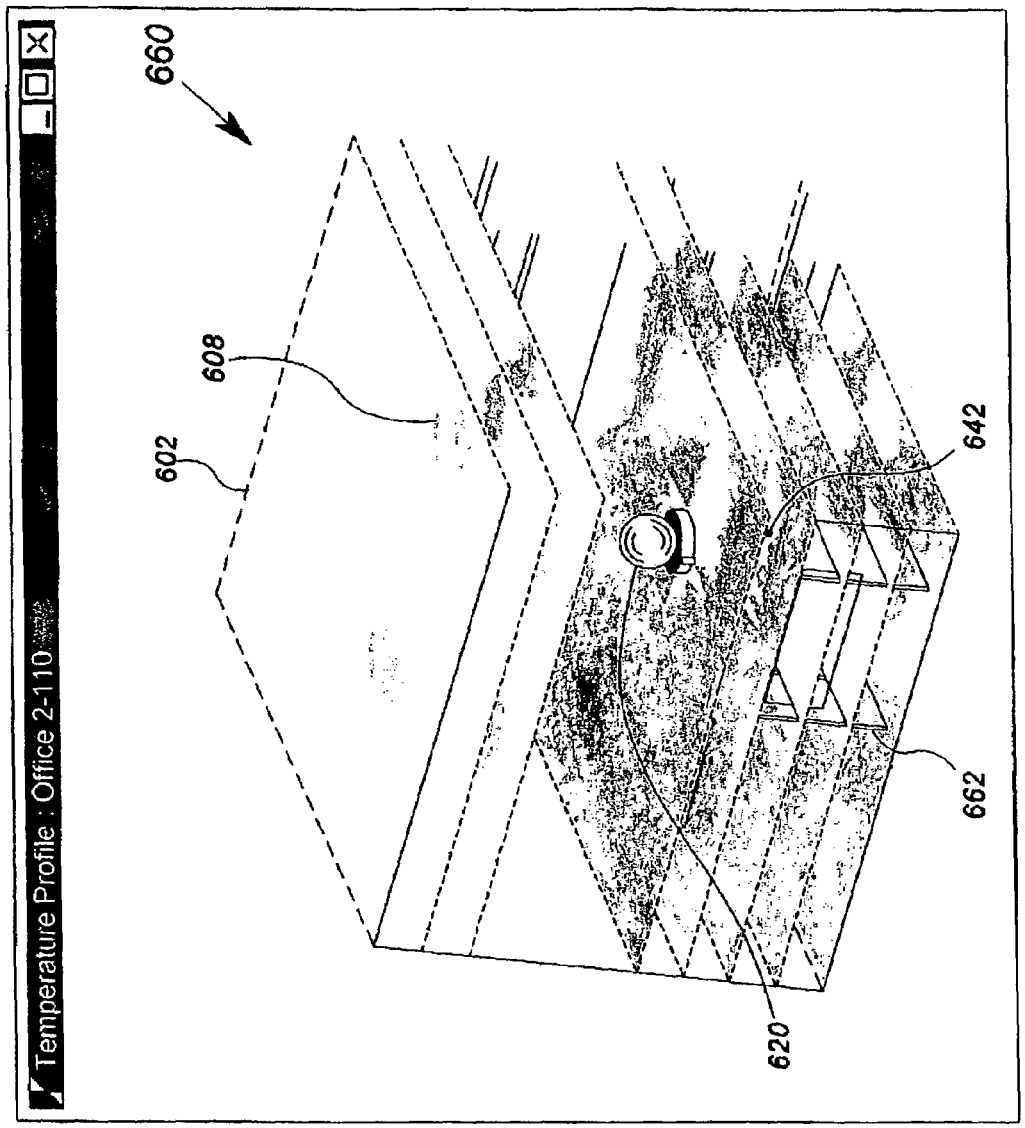
FIG. 16 shows a display of a portion of the temperature profiles and the room of FIG. 15 after changing, with respect to FIG. 15, the viewing angle and the amount of data displayed.

Moreover, the modeling system 420 allows a user to manipulate the manner in which the data is presented. By way of example, FIG. 16 shows a screen display 660 which shows a portion of the room 602. The view of the room 602 in FIG. 16 is from a position about 90 degrees counter-clockwise from the position from which the room 602 is shown in FIG. 15. Thus, the desk 662 shown in FIG. 16 beside the MEMS module 642 is directly across the room from the desk 616 of FIG. 15.

In addition to rotating the view from the view shown in FIG. 15, FIG. 16 shows that the user has selected to see a cross-sectional slice across the room 602. Thus, the temperature profile from the room 602 to the floor of the room 602 is readily observed. Of course, additional views are possible since the display of the model 428 may be rotated in six dimensions. Moreover, the room 602 may be sliced at a number of different locations along the width, the length or the height of the room 602.

Additionally, while only a small number of MEMS modules have been specifically identified within the display 600 and the display 660, it is possible to use the modeling system 420 with additional or fewer sensor modules. Obviously, as the number of data points increases, the granularity of the data also increases. The use of MEMS modules is particularly advantageous in providing a large number of data points since MEMS modules are extremely small. Thus, a large number of MEMS modules may be distributed throughout a space. For example, MEMS modules may be included in walls, in wall covering or paint, within furniture, on individuals and even spread throughout carpet.

Figure 17:
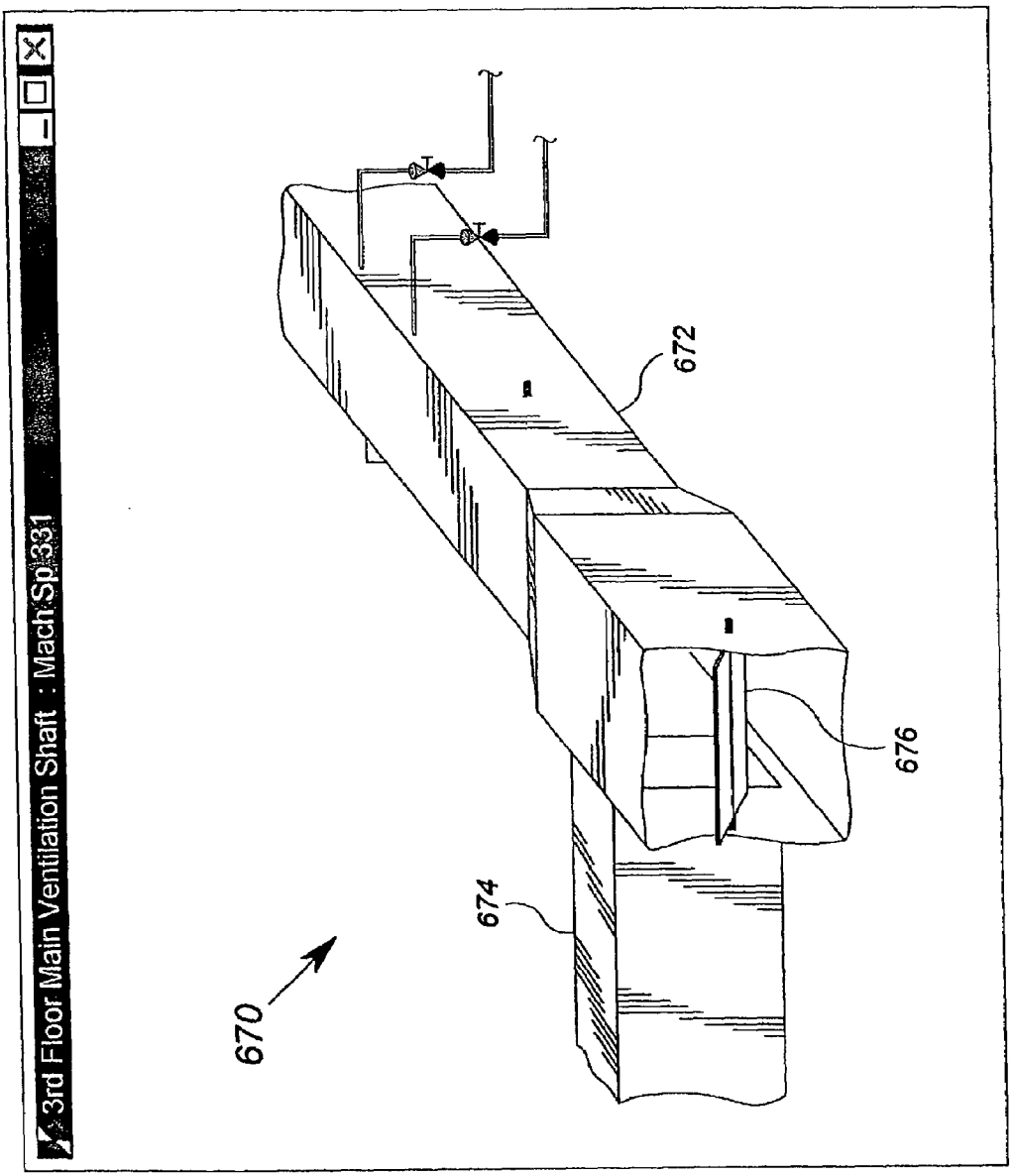
FIG. 17 shows a display of a portion of a ventilation system including a ventilation shaft, a branch shaft and a damper generated by a modeling system in accordance with aspects of the invention.

The modeling system 420 may also be used to present the results of the various programs that may be run in association with the modeling system 420. To this end, FIG. 17 shows a display 670 that is presented to a user based upon the results of a fault detection and isolation program that has analyzed the loss of ventilation in a space. FIG. 17 shows a portion of a ventilation shaft 672, and a branch shaft 674. The display 670 shows the components rotated so that that the main damper 676 for the ventilation shaft 672 is visible. Thus, a user can see that the damper 676 is opened and is not the cause of the lack of ventilation.

Although not shown in FIG. 17, the actual location of the ventilation shaft 672 within the building would also be presented. This may in the form of a display of the entire building that progressively focuses in on the area of interest. The progressive views may be shown automatically and/or in response to input from the user. In this embodiment, the user is guided toward the detected fault by making a portion of the display flash. The user then selects a portion of the display to be magnified as shown in FIG. 18.

Figure 18:
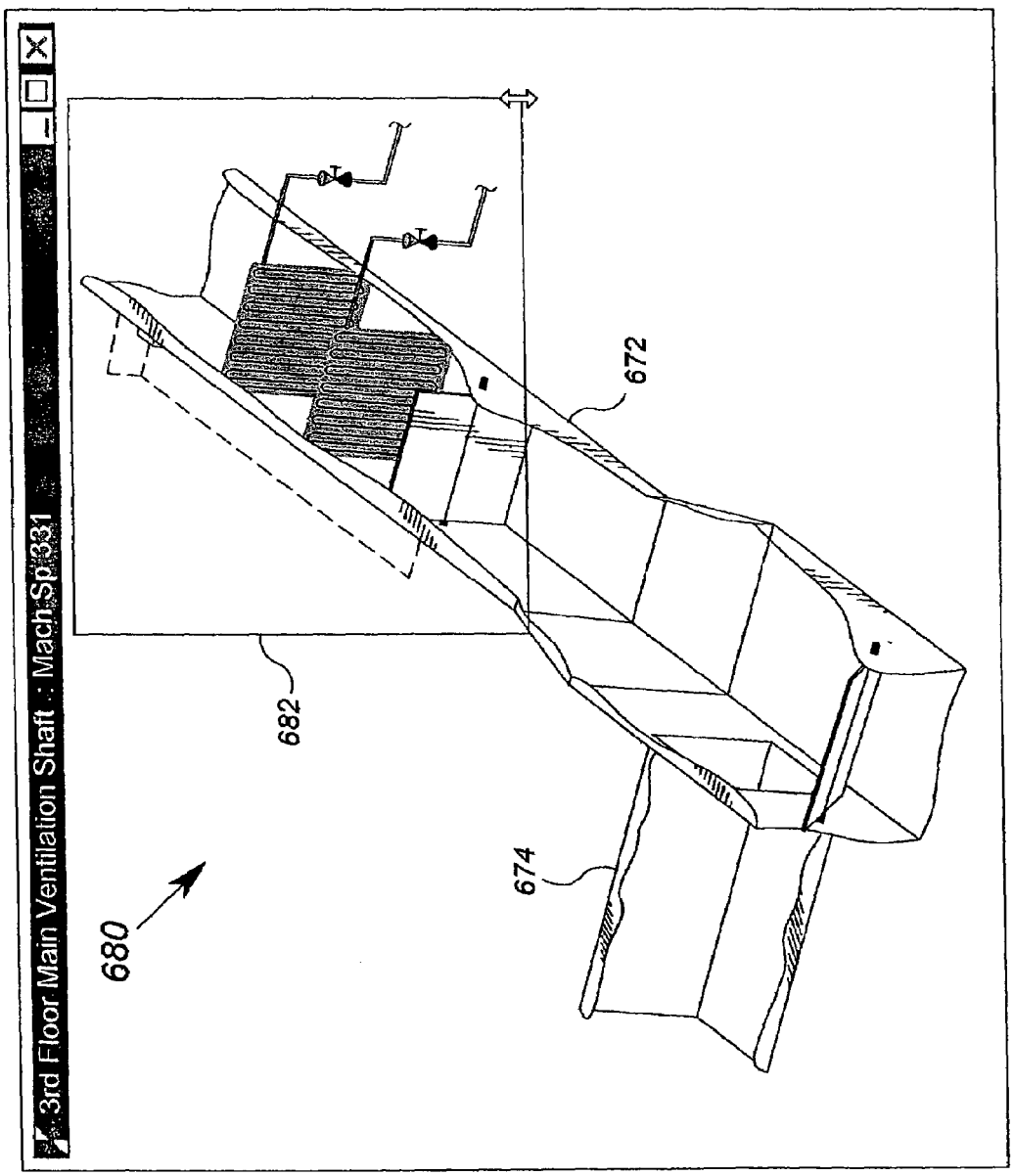
FIG. 18 shows a display of a partially cutaway view of the display of FIG. 17 revealing components within the ventilation shaft of FIG. 17 generated by a modeling system in accordance with aspects of the invention.

The display 680 shown in FIG. 18 shows the ventilation shaft 672 and the branch shaft 674 rotated such that more of the top portions of the shafts are visible. Additionally, the user has selected an area 682 for closer inspection. In response, the modeling system 420 displays the inner components of the ventilation shaft 672 along with external connections. These components are shown more clearly in the display 684 of FIG. 19.

Figure 19:
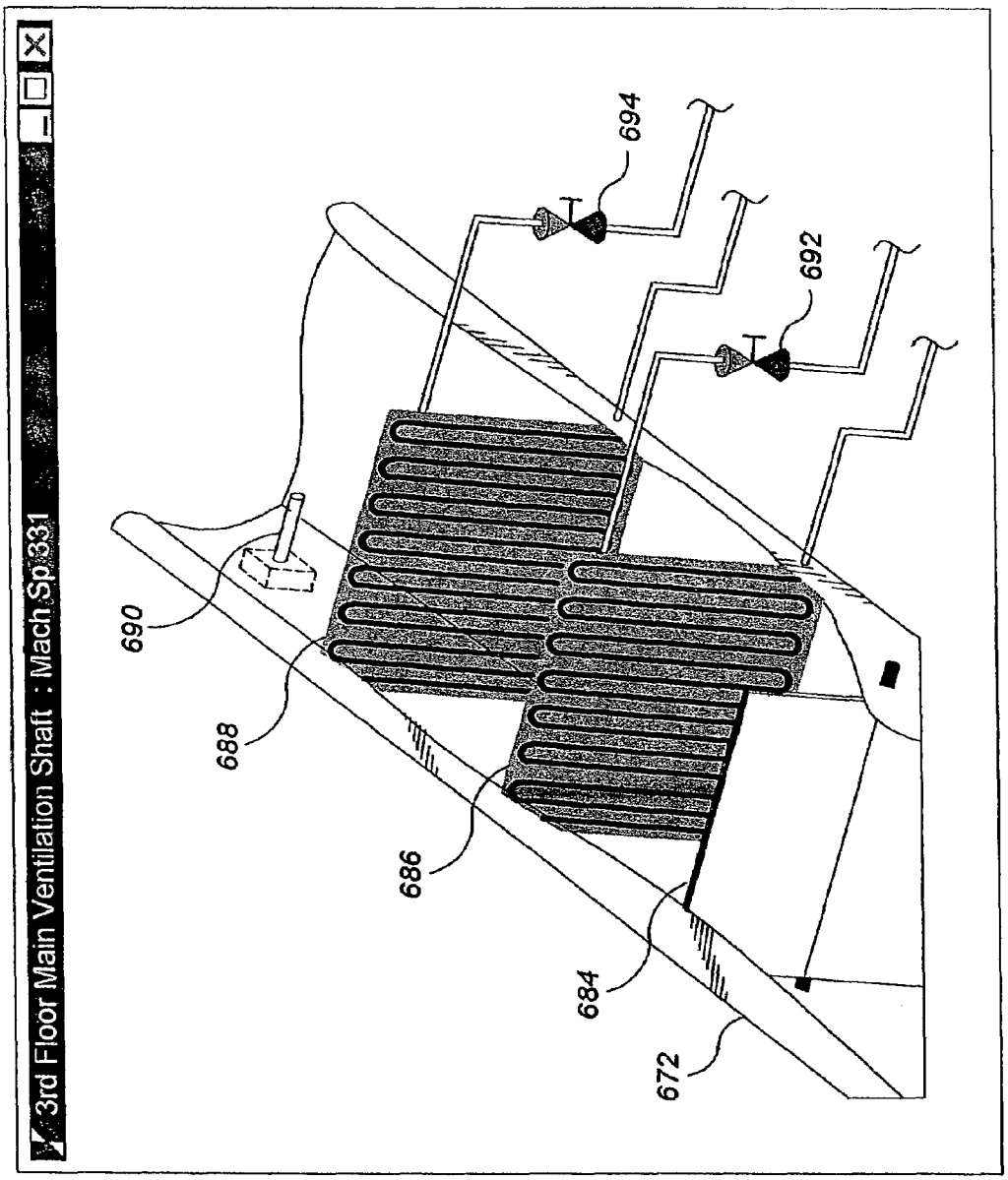
FIG. 19 shows a display of a magnified view of the cutaway portion of the ventilation shaft shown in FIG. 18 generated by a modeling system in accordance with aspects of the invention.

FIG. 19 shows a fire damper 684, a heater 686 a chiller 688 and a fusible link 690. Hot water is provided to the heater 686 through the supply valve 692 and chilled water is supplied to the chiller through the supply valve 694. The fusible link 690 provides for automated closure of the fire damper 684. Specifically, when exposed to high temperatures as would be present in the case of a fire, a portion of the fusible link melts allowing the fire damper 684 to close as is known in the art.

Figure 20:
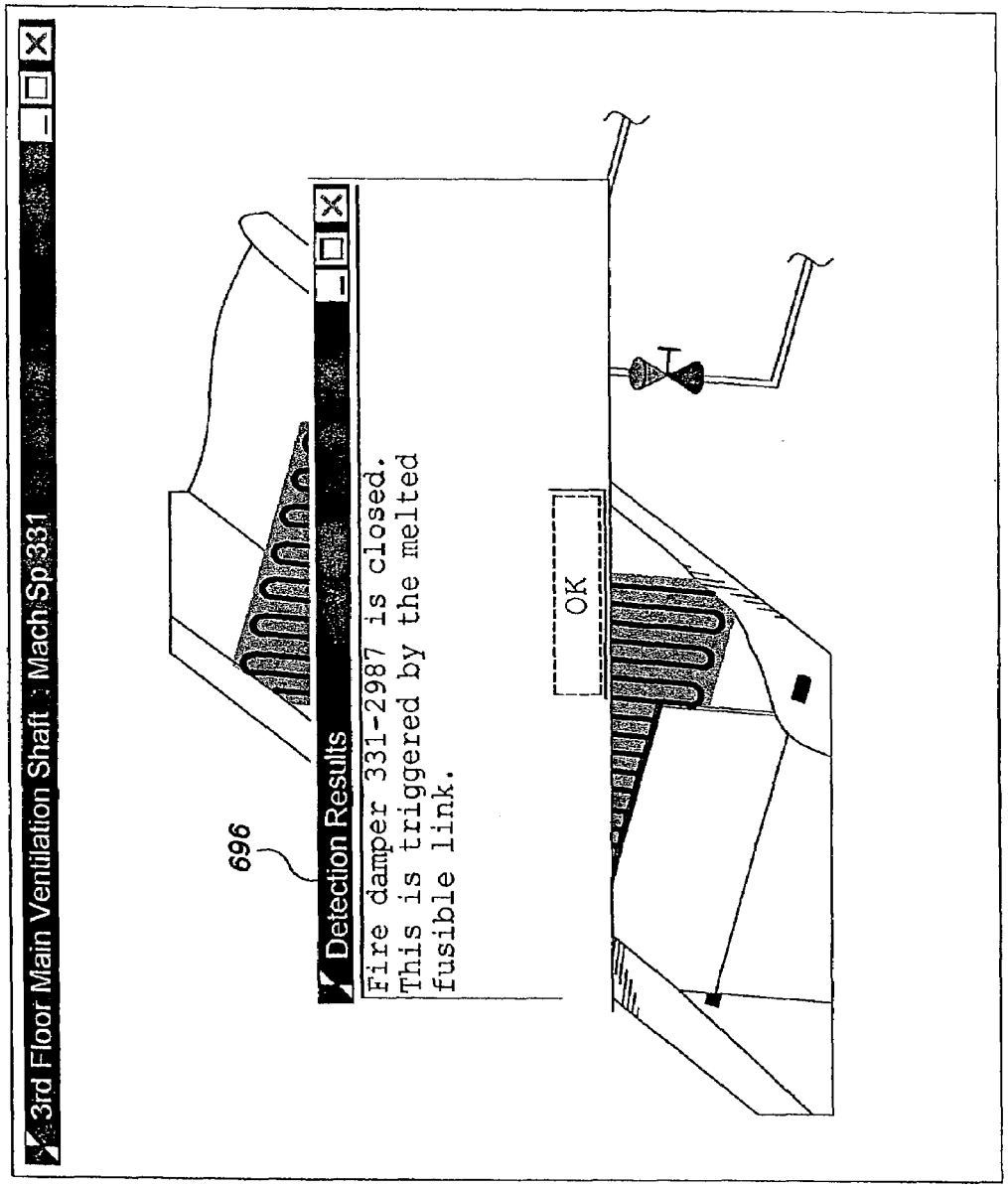
FIG. 20 shows a display of a dialogue box generated by a modeling system identifying a fault detected by a building control system in accordance with aspects of the invention.

As shown in FIG. 19, the fire damper 684 is closed. The modeling system 420 has thus provided the user with a visual presentation of the results of a diagnostic program. Specifically, the loss of ventilation was caused by the closure of the fire damper 684. The modeling system 420 further allows the diagnostic program to ascertain the status of the fusible link 690 which in this example is "melted". Accordingly, as shown in the dialogue box 696 of FIG. 20, the user is informed that the reason for the closure of the fire damper 684 is that the fusible link 690 has melted.

As discussed above, the object oriented database may be used to store a large amount of data concerning the building and its components or machinery. Accordingly, after identifying the faulty fusible link 690, the replacement information for the fusible link 690 may be retrieved from the data base. Additionally, the modeling system 420 may provide information as to alternative ventilation system configurations that may be used to provide ventilation to the space until such time as the fusible link 690 is replaced. This information may be obtained from a supervisory computer.

Figure 21:
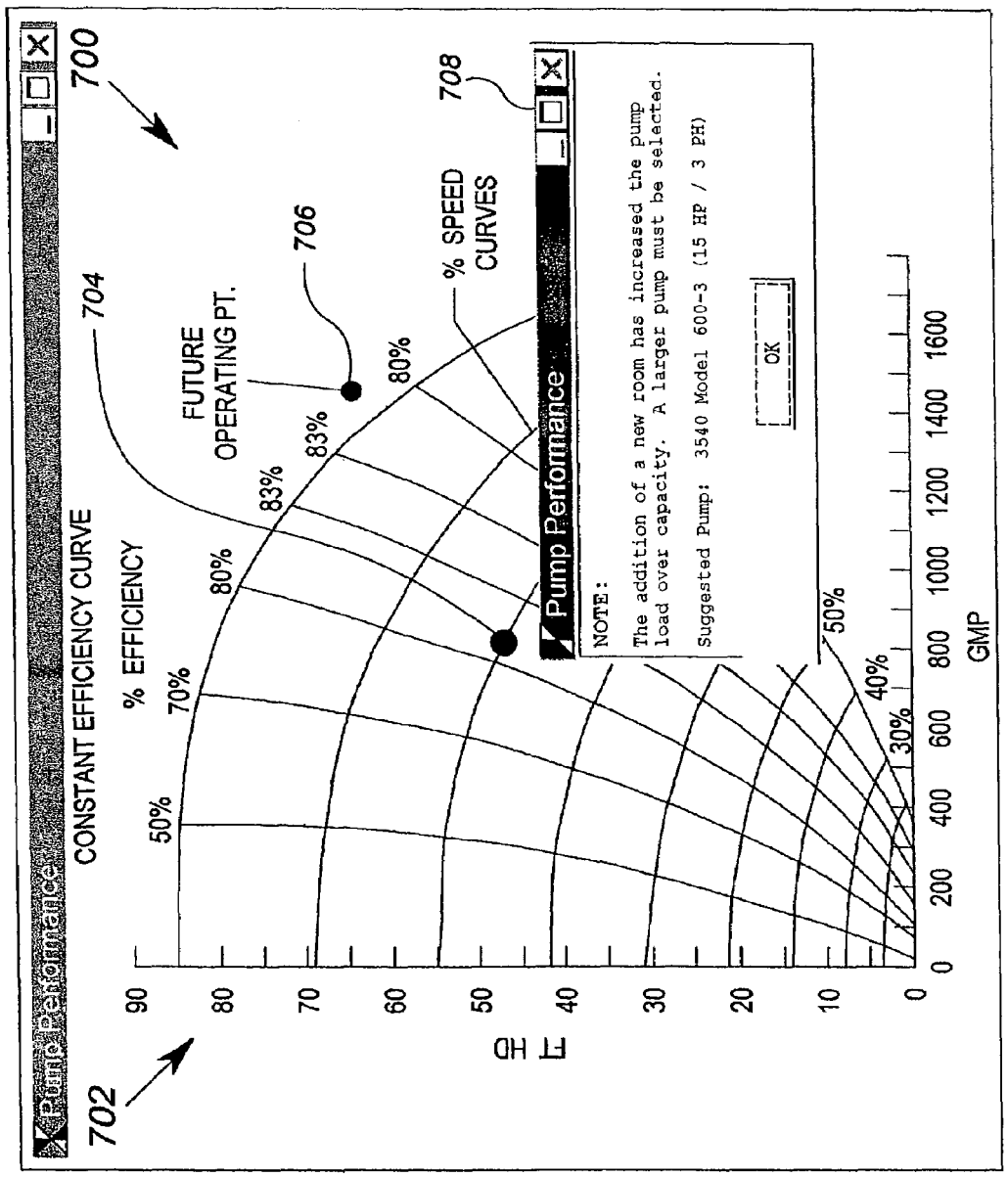
FIG. 21 shows a display of a pump efficiency graph with a current operating point and a modeled future operating point generated by a modeling system in accordance with aspects of the invention.

The present invention further enables determination of the effect of changes of, to or within a system. This is enabled in part by including data such as efficiency curves and design operating characteristics into the modeling system 420 as discussed above with respect to the FIG. 14. Accordingly, the modeling system 420 may provide displays such as display 700 shown in FIG. 21.

Display 700 includes a pump efficiency graph 702 for a pump modeled within the modeling system 420. The modeling system 420 has also plotted the current operating point 704 of the pump based upon data received from a performance control subsystem. Once data regarding a proposed change to the modeled system is input, in this example the addition of a room, the modeling system 420 is operable to determine the required operating characteristics of the pump in order to provide services to the new room. The new operating point 706 of the pump is also shown by the display 700.

The modeling system 420 further compares the new operating point 706 to the pump efficiency graph 702 and determines that the new operating point is beyond the capabilities of the currently installed pump. Accordingly, the display 700 includes a dialogue box 708 alerting the user to this fact.

In the embodiment of the modeling system 420 used for generating the display 700, the modeling system 420 is further provided with access to a database that includes various alternative equipment and operating characteristics. Such a database may be incorporated into the memory 426 of the modeling system 420. Alternatively, the modeling system 420 may include a program designed to search a network such as the Internet to obtain access to such a database.

Figure 22:
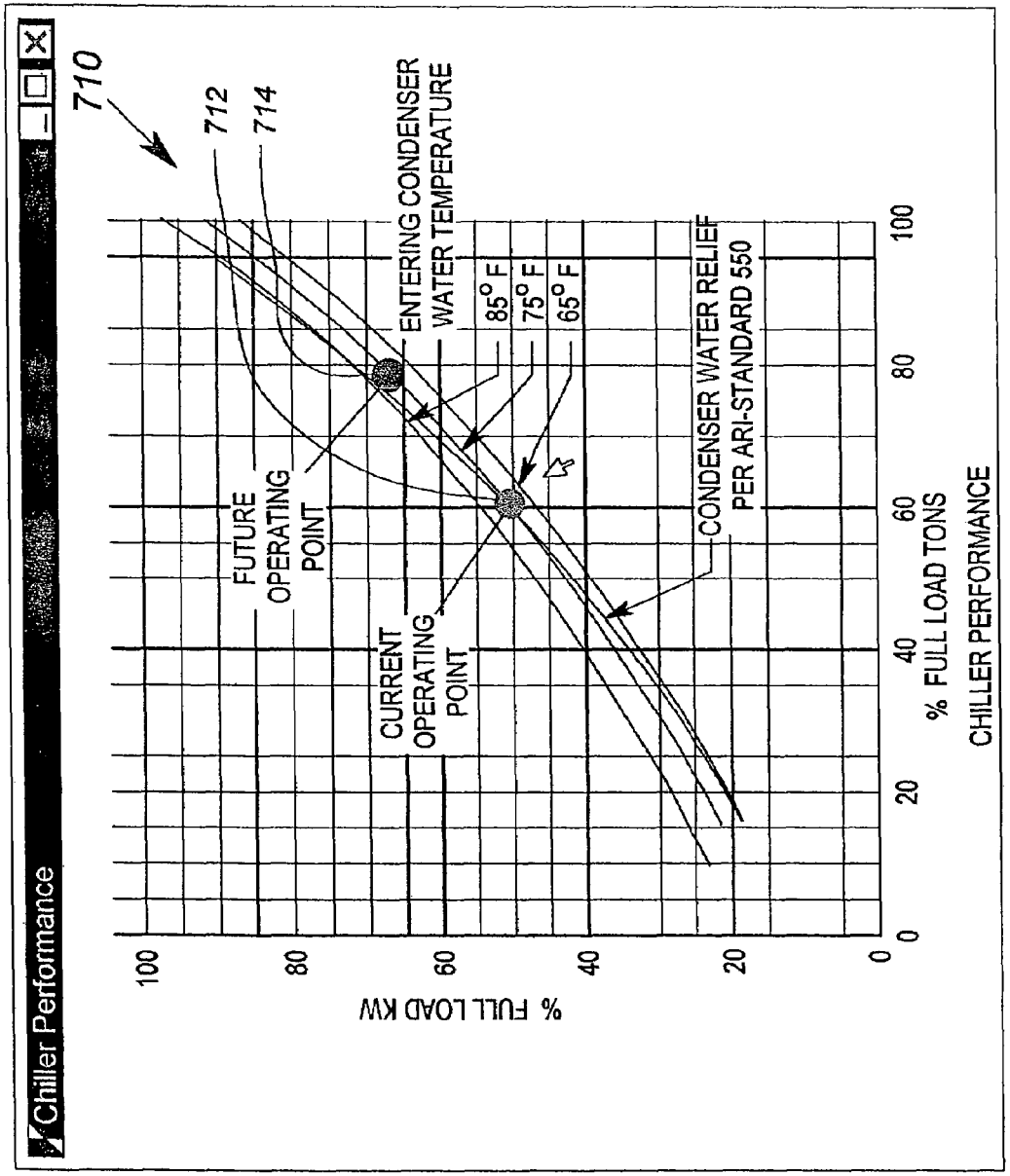
FIG. 22 shows a display of a chiller performance graph with a current operating point and a modeled future operating point generated by a modeling system in accordance with aspects of the invention.

After identifying a potential replacement pump, the modeling system 420 in this embodiment determines the effect of using the replacement pump in the system. FIG. 22 shows a display 710 of the operating characteristics of a chiller. The current operating point 712 is plotted as is the projected operating point 714 based upon the inclusion of the replacement pump. Thus, the modeling system 420 determines whether any additional equipment must be replaced in order to support the use of a new pump.

Figure 23:
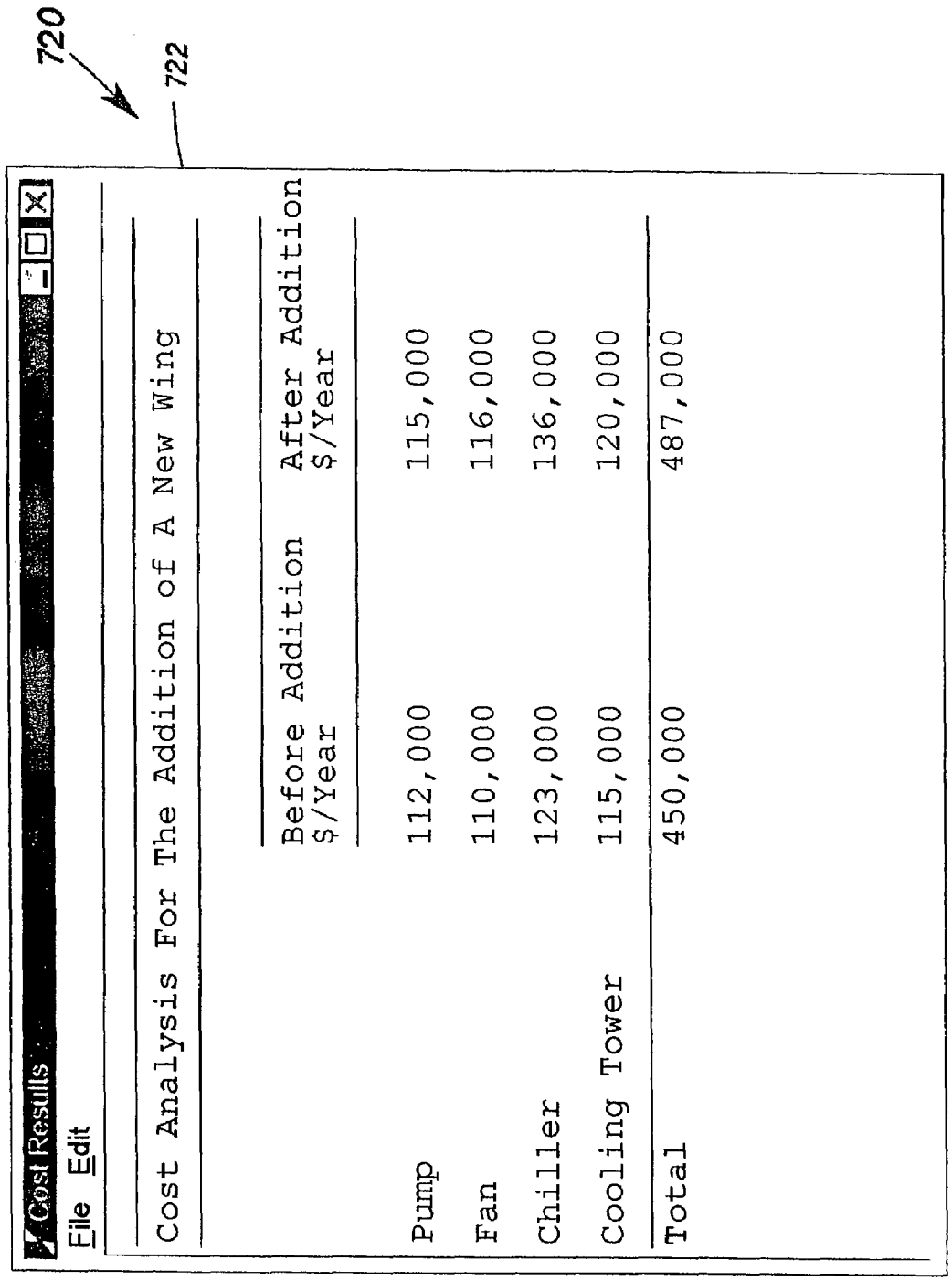
FIG. 23 shows a display of a dialogue box showing the change in operating expenses resulting from the addition of a new room generated by a modeling system in accordance with aspects of the invention.

Moreover, the modeling system 420 is able to identify not only the new equipment that will be needed, but also the change in operating expenses based upon the modeled replacement. FIG. 23 shows a display 720 of a dialogue box 722. The dialogue box 722 provides a detailed cost analysis of the operating expenses that should result if the new room is actually added.

It will be appreciated that the above describe embodiments are merely exemplary, and that those of ordinary skill in the art may readily devise their own modifications and implementations that incorporate the principles of the present invention and fall within the spirit and scope thereof.

I claim:

1. A building component system comprising:
    a building component located between a first area and a second area and controllable between a first state and a second state;
    a first sensor for sensing a first condition in the first area;
    a second sensor for sensing a second condition in the second area;
    a controller for controlling the state of the component based upon the sensed first condition and the sensed second condition;
    wherein the component comprises a window with a first layer controllable between the first state wherein energy is allowed to pass through the first layer and the second state wherein energy is restrained from passing through the first layer;
    wherein the window comprises a second layer controllable between a third state wherein energy is allowed to pass through the second layer and a fourth state wherein energy is restrained from passing through the second layer;
    wherein the first layer and the second layer are spaced apart and the window further comprises a thermal fluid compartment located between the first layer and the second layer; and
    wherein the system further comprises
    a thermal energy storage device for storing thermal energy, and
    a pump for pumping thermal fluid between the thermal fluid compartment and the thermal energy storage device so as to transfer energy between the window and the thermal energy storage device.

2. The system of claim 1, wherein:
    the first sensor is a micromechanical systems sensor located within a first module;
    the controller is located within a second module; and
    the first module and the second module are configured to communicate over a first wireless network.

3. The system of claim 2, wherein the second sensor is located within a third module, and wherein the second module and the third module are configured to communicate over a second wireless network.

4. The system of claim 1, wherein the thermal fluid comprises nano particles to increase the thermal energy transfer rate between the window and the thermal energy storage device.

5. The system of claim 1, wherein the first sensor comprises a MEMS sensor disposed on an outer side of the window and the second sensor comprises a MEMS sensor disposed on an inner side of the window.

6. The system of claim 1, wherein the first state is a transparent state and the second state is an opaque state.

7. The system of claim 1, wherein the first sensor is disposed on an outer side of the window and the second sensor is disposed on an inner side of the window.

8. A building component system comprising:
    a building component located in a partition between a first area and a second area and having first and second surfaces spaced apart from each other, at least one of the first and second surfaces having a controllable energy conductance;
    a first sensor for sensing a first condition in the first area;
    a second sensor for sensing a second condition in the second area;
    a controller for controlling the energy conductance of at least one of the first and second surfaces based upon the sensed first condition and the sensed second condition
    a thermal fluid compartment located between the first surface and the second surface,
    a thermal energy storage device for storing thermal energy, and
    a pump for pumping thermal fluid between the thermal fluid compartment and the thermal energy storage device so as to transfer energy between the thermal energy storage device and at least one of the first and second surfaces;
    wherein the building component comprises a window with the first surface controllable between the first state wherein energy is allowed to pass through the first surface and the second state wherein energy is restrained from passing through the first surface; and
    wherein the second surface is controllable between a third state wherein energy is allowed to pass through the second surface and a fourth state wherein energy is restrained from passing through the second surface.

9. The system of claim 8, wherein:
    the first sensor is a micromechanical systems sensor located within a first module;
    the controller is located within a second module; and
    the first module and the second module are configured to communicate over a first wireless network.

10. The system of claim 9, wherein the second sensor is located within a third module, and wherein the second module and the third module are configured to communicate over a second wireless network.

11. The system of claim 8, wherein the thermal fluid comprises nano particles to increase the thermal energy transfer rate between the thermal energy storage device and the at least one of the first and second surfaces.

12. The system of claim 8, wherein the first state is a transparent state and the second state is an opaque state.

13. The system of claim 8, wherein the first sensor is disposed on an outer side of the window and the second sensor is disposed on an inner side of the window.

14. The system of claim 8, wherein the first sensor comprises a MEMS sensor disposed on an outer side of the window and the second sensor comprises a MEMS sensor disposed on an inner side of the window.

* * * * *